(12) United States Patent
Zhang et al.

(10) Patent No.: US 12,603,321 B2
(45) Date of Patent: Apr. 14, 2026

(54) BATTERY SEPARATORS, ELECTRODES, CELLS, LITHIUM BATTERIES AND RELATED METHODS

(71) Applicant: Celgard, LLC, Charlotte, NC (US)

(72) Inventors: Zhengming Zhang, Rock Hill, SC (US); Weifeng Fang, Charlotte, NC (US)

(73) Assignee: CELGARD, LLC, Charlotte, NC (US)

( * ) Notice: Subject to any disclaimer, the term of this patent is extended or adjusted under 35 U.S.C. 154(b) by 734 days.

(21) Appl. No.: 16/494,832

(22) PCT Filed: Mar. 19, 2018

(86) PCT No.: PCT/US2018/023107
§ 371 (c)(1),
(2) Date: Sep. 17, 2019

(87) PCT Pub. No.: WO2018/175300
PCT Pub. Date: Sep. 27, 2018

(65) Prior Publication Data
US 2020/0044278 A1 Feb. 6, 2020

Related U.S. Application Data

(60) Provisional application No. 62/473,596, filed on Mar. 20, 2017.

(51) Int. Cl.
*H01M 4/50* (2010.01)
*H01M 4/52* (2010.01)
(Continued)

(52) U.S. Cl.
CPC ......... *H01M 10/0525* (2013.01); *H01M 4/50* (2013.01); *H01M 4/52* (2013.01);
(Continued)

(58) Field of Classification Search
CPC ...... H01M 50/40; H01M 50/403; H01M 4/50; H01M 4/52; H01M 4/583
See application file for complete search history.

(56) References Cited

U.S. PATENT DOCUMENTS 5,952,120 A * 9/1999 Yu ....................... H01M 50/417
264/288.4
6,432,586 B1 8/2002 Zhang
(Continued)

FOREIGN PATENT DOCUMENTS

CN 1325145 A 12/2001
CN 101276899 A 10/2008
(Continued)

OTHER PUBLICATIONS

EP Extended Search Report dated Nov. 5, 2020; from counterpart EP Application No. 18771545.3.
(Continued)

*Primary Examiner* — Kenneth J Douyette
(74) *Attorney, Agent, or Firm* — J. Clinton Wimbish; Maynard Nexsen PC

(57) ABSTRACT

An improved battery separator and an energy cell comprising the improved battery separator are provided. The improved battery separator comprises a porous membrane having at least one of the following properties when wet with electrolyte: has no or low volume; has no or low mass; soaks as much liquid electrolyte as possible; blocks or removes any harmful substances in the electrolyte; never melts at any high temperature; does not react with the cathode or the anode under any conditions; has a mechanical strength equal to or greater than steel; is an electronic insulator under any conditions; and blocks metal dendrite growth.

10 Claims, 22 Drawing Sheets

DCIR Measurement

(51) Int. Cl.
   *H01M 4/583* (2010.01)
   *H01M 10/0525* (2010.01)
   *H01M 10/0567* (2010.01)
   *H01M 4/02* (2006.01)
   *H01M 50/403* (2021.01)
   *H01M 50/406* (2021.01)
   *H01M 50/489* (2021.01)
   *H01M 50/491* (2021.01)

(52) U.S. Cl.
   CPC ....... *H01M 4/583* (2013.01); *H01M 10/0567* (2013.01); *H01M 2004/027* (2013.01); *H01M 2004/028* (2013.01); *H01M 50/403* (2021.01); *H01M 50/406* (2021.01); *H01M 50/489* (2021.01); *H01M 50/491* (2021.01); *H01M 2300/0051* (2013.01)

(56) References Cited

U.S. PATENT DOCUMENTS

| | | | |
|---|---|---|---|
| 2002/0031706 A1* | 3/2002 | Dasgupta | H01M 4/13 429/231.95 |
| 2004/0219428 A1 | 11/2004 | Nagayama | |
| 2006/0246355 A1* | 11/2006 | Min | H01M 10/0561 429/322 |
| 2008/0248387 A1 | 10/2008 | Hinoki et al. | |
| 2010/0115770 A1 | 5/2010 | Eggert et al. | |
| 2011/0206973 A1 | 8/2011 | Brant et al. | |
| 2011/0223486 A1* | 9/2011 | Zhang | B29C 55/143 521/143 |
| 2012/0231321 A1* | 9/2012 | Huang | H01M 50/406 29/623.5 |
| 2013/0236767 A1* | 9/2013 | Nishikawa | H01M 50/491 156/60 |
| 2013/0337312 A1* | 12/2013 | Park | H01M 50/403 427/126.3 |
| 2014/0045033 A1 | 2/2014 | Zhang et al. | |
| 2014/0079980 A1 | 3/2014 | Halmo et al. | |
| 2014/0087238 A1* | 3/2014 | Kelley | H01M 10/121 429/300 |
| 2015/0079450 A1 | 3/2015 | Wensley et al. | |
| 2015/0325828 A1 | 11/2015 | Herle et al. | |
| 2016/0156010 A1 | 6/2016 | Chen et al. | |
| 2016/0164060 A1* | 6/2016 | Zhang | H01M 50/431 429/144 |
| 2016/0190540 A1 | 6/2016 | Oshima et al. | |
| 2016/0240885 A1 | 8/2016 | Nishimura | |
| 2016/0248066 A1 | 8/2016 | Shi et al. | |
| 2016/0322662 A1* | 11/2016 | Schmitz | H01M 50/449 |
| 2016/0372729 A1* | 12/2016 | Archer | H01M 50/497 |

FOREIGN PATENT DOCUMENTS

| | | |
|---|---|---|
| CN | 103117410 A | 5/2013 |
| CN | 103682209 A | 3/2014 |
| CN | 104577005 A | 4/2015 |
| CN | 104838518 A | 8/2015 |
| CN | 105594050 A | 5/2016 |
| CN | 105990546 A | 10/2016 |
| CN | 106063012 A | 10/2016 |
| CN | 205985153 U | 2/2017 |
| EP | 1482582 | 12/2004 |
| JP | 2001-319634 A | 11/2001 |
| JP | 2004-335167 A | 11/2004 |
| JP | 2007-522620 A | 8/2007 |
| JP | 2012-506762 A | 3/2012 |
| JP | 2012-506792 A | 3/2012 |
| JP | 2015-041434 A | 3/2015 |
| JP | 2015-528633 A | 9/2015 |
| JP | 2015-534228 A | 11/2015 |
| JP | 2016-126888 A | 7/2016 |
| JP | 2016-531993 A | 10/2016 |
| JP | 2017-536677 A | 12/2017 |
| JP | 2018-512701 A | 5/2018 |
| KR | 10-2009-0108317 A1 | 10/2009 |
| KR | 10-2015-0042216 A | 4/2015 |
| WO | 2005/076936 A2 | 8/2005 |
| WO | 2015/042213 A1 | 3/2015 |
| WO | 2015/046468 A1 | 4/2015 |
| WO | 2015/126379 A1 | 8/2015 |
| WO | 2016/090199 A1 | 6/2016 |
| WO | 2016/138258 A1 | 9/2016 |
| WO | WO 2017/083633 A1 | 5/2017 |

OTHER PUBLICATIONS

A Review of Electrolyte Additives for Lithium-Ion Batteries, J. of Power Sources, vol. 162, Issue 2, 2006, pp. 1379-1394.

First office action received for Chinese Patent Application No. 201880032347.0, mailed on Nov. 22, 2021, 13 pages including English translation.

Second office action received for Chinese Patent Application No. 201880032347.0, mailed on Jun. 16, 2022, 16 pages including English translation.

Office Action received for European Patent Application No. 18771545.3, mailed on Feb. 2, 2023, 04 pages.

Search Report received for Japanese Patent Application No. 2019-551711, mailed on Feb. 10, 2022, 50 pages including English translation.

First Office Action received for Japanese Patent Application No. 2019-551711, mailed on Feb. 22, 2022, 12 pages including English translation.

Second Office Action received for Japanese Patent Application No. 2019-551711, mailed on Sep. 13, 2022, 09 pages including English translation.

First Office Action received for Japanese Patent Application No. 2023-019990, mailed on Jun. 4, 2024, 04 pages including English translation.

Second Office Action received for Japanese Patent Application No. 2023-019990, mailed on Dec. 3, 2024, 06 pages including English translation.

Decision of Refusal received for Japanese Patent Application No. 2023-019990, mailed on Mar. 11, 2025, 06 pages including English translation.

First Office Action received for Korean Patent Application No. 10-2019-7030850, mailed on Sep. 19, 2022, 11 pages including English translation.

Second Office Action received for Korean Patent Application No. 10-2019-7030850, mailed on Mar. 27, 2023, 09 pages including English translation.

First Final Rejection received for Korean Patent Application No. 10-2019-7030850, mailed on Aug. 16, 2023, 07 pages including English translation.

Second Final Rejection received for Korean Patent Application No. 10-2019-7030850, mailed on Nov. 23, 2023, 06 pages including English translation.

First Office Action received for Korean Patent Application No. 10-2024-7005763, mailed on Sep. 27, 2024, 11 pages including English translation.

First Final Rejection received for Korean Patent Application No. 10-2024-7005763, mailed on Apr. 21, 2025, 07 pages including English translation.

International Search Report and Written Opinion received for International Patent Application No. PCT/US2018/023107, mailed on Jul. 10, 2018, 13 pages.

International preliminary report on patentability received for International Patent Application No. PCT/US2018/023107, mailed on Oct. 3, 2019, 10 pages.

* cited by examiner

Ionic Transport, Tortuosity, and Gurley → (Impedance vs. DCR)

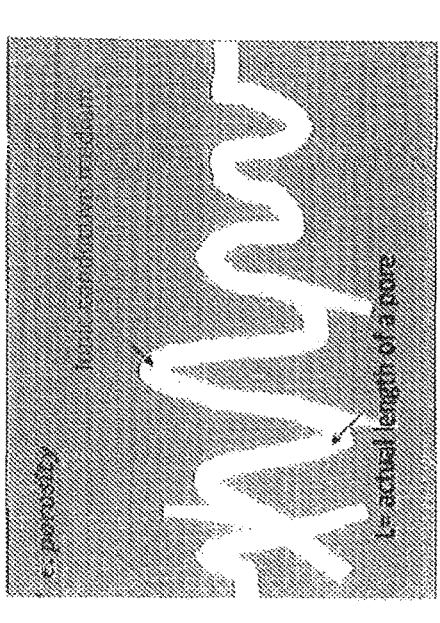

* Li⁺ transport in ionic conductive medium is totally different from fluid flow through porous material. In the former, the medium doesn't flow.

* Tortuosity is the ratio of the resistivity of a separator membrane ($\rho_s$) to that of the electrolyte ($\rho_e$) shown as MacMullin number ($N_m$) equation, where $\epsilon$ is the Porosity.

$$\frac{\rho_s}{\rho_e} = N_m = \frac{\tau^2}{\epsilon}$$

* Solid state electrolytes, gel electrolytes and many liquid electrolytes uptake polymers have Gurley=infinity, however, it does transport ions and its $\tau=1$ (always).

$$tortuosity, \tau = \frac{L}{x}$$

Fig. 1

Figure 2:
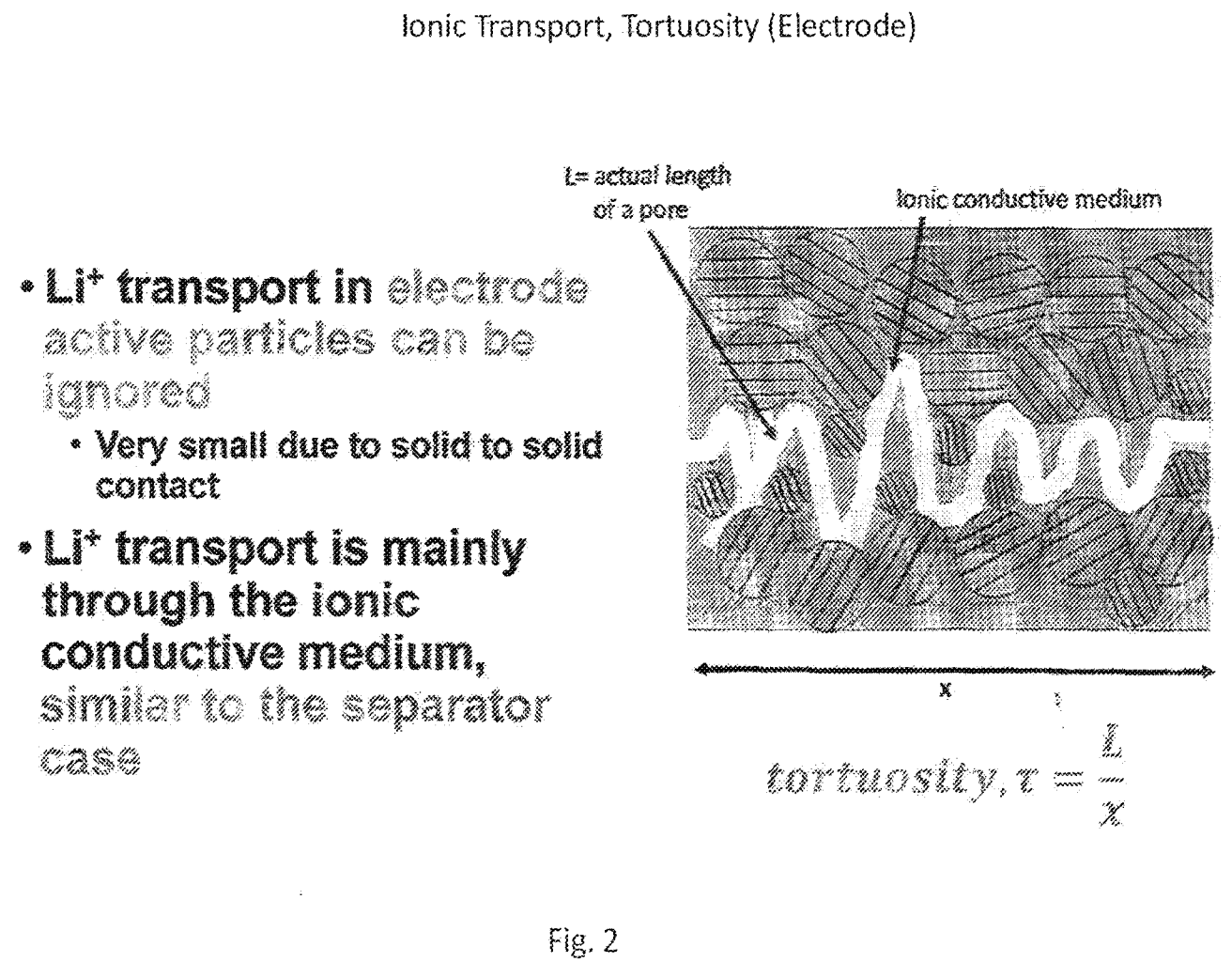

Ionic Transport, Tortuosity (Electrode)

Ionic conductive medium

L= actual length of a pore x $$tortuosity, \tau = \frac{L}{x}$$

- Li⁺ transport in electrode active particles can be ignored
  - Very small due to solid to solid to solid contact
- Li⁺ transport is mainly through the ionic conductive medium, similar to the separator case

Figure 4:
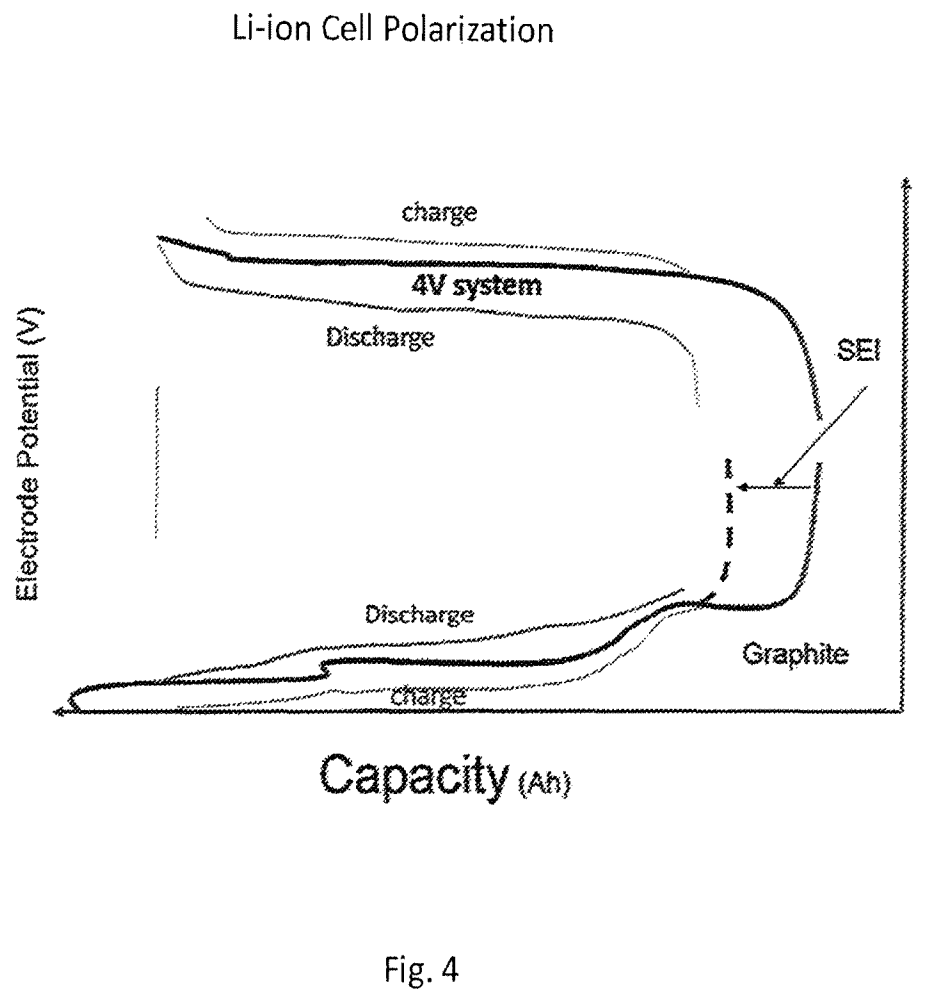

Illustration: Li Concentration in Electrode Particles after High Current Discharge

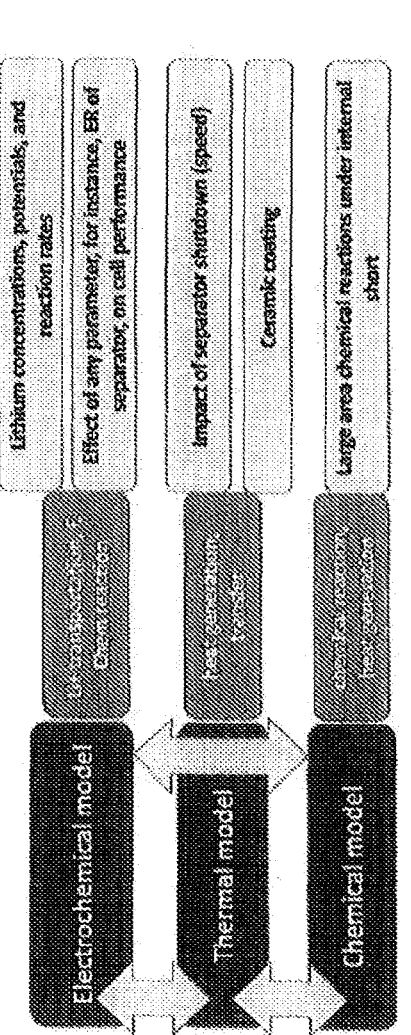

Electrochemical, Thermal, Chemical Model (Published on J. Power Source)

Porous electrodes and porous separator are the basics of Li-ion which cannot be studied by classic electrochemistry and experiments, but only by advance model.

Lithium concentrations, potentials, and reaction rates

Effect of any parameter, for instance, ER of separator, on cell performance

Impact of separator shutdown (speed)

Ceramic coating

Large area chemical reactions under internal short

Electrochemical model

Thermal model

Chemical model

By coupling all the three models, we are able to investigate various short scenarios in Li-ion cells.

Fig. 6

Basic Electrochemical Equations

Electron transport in electrode (Solid)

Ion migration (Diffusion and Reaction) in electrolyte

Li diffusion in active material

Li diffusion in electrolyte

B-V equation $$\frac{\partial}{\partial x}\left(\sigma^{\text{eff}}\frac{\partial}{\partial x}\phi_s\right)=j^{Li}$$

$$\frac{\partial}{\partial x}\left(\kappa^{\text{eff}}\frac{\partial}{\partial x}\phi_e\right)+\frac{\partial}{\partial x}\left(\kappa_D^{\text{eff}}\frac{\partial}{\partial x}\ln c_e\right)=-j^{Li}$$

$$\frac{\partial c_s}{\partial t}=\frac{D_s}{r^2}\frac{\partial}{\partial r}\left(r^2\frac{\partial c_s}{\partial r}\right)$$

$$\frac{\partial(\varepsilon_e c_e)}{\partial t}=\frac{\partial}{\partial x}\left(D_e^{\text{eff}}\frac{\partial}{\partial x}c_e\right)+\frac{1-t_+^0}{F}j^{Li}$$

$$j^{Li}=a_s i_0\left[\exp\left(\frac{\alpha_a F}{RT}(\phi_s-\phi_e-U)\right)-\exp\left(-\frac{\alpha_c F}{RT}(\phi_s-\phi_e-U)\right)\right]$$

Fig. 7

Review of Potentials in Li-ion (B-V Eq)

Lithium Concentration in Electrolyte

Anode Potential Drop at 4C Charge

2X Electrode Thickness: Beginning State (t=0)

Charge Rate vs. Capability (Green) or Li Deposition Starts (Orange)

| Percentage of CC (Const. Current) Capacity (%) | | Charge Current, C-rate (1C=2.3mA/cm2) | | | | | |
|---|---|---|---|---|---|---|---|
| | | 0.5C | 2.0C | 3.5C | 4.0C | 4.5C | 5.0C |
| Electrode Thickness | 1x (baseline) | 99 | 87 | 78 | 58 | 41 | 33 |
| | 1.5x | 91 | 79 | 69 | 65 | 61 | 33 |
| | 2x | 82 | 70 | 58 | 52 | 47 | 30 |

- Baseline thickness: Anode=61um, Cathode=74um
- The percentage of CC capacity is calculated based on the amount of active material.

Fig. 19

Electrode Porosity vs. Charge Rate Capability (Green) or Li Deposition Starts (Orange)

Electrode thickness is changed accordingly to keep same amount of active material.

| Percentage of CC (Const. Current) Capacity (%) | Charge Current, C-rate (1C=2.3mA/cm2) | | | | | | |
|---|---|---|---|---|---|---|---|
| | 0.5C | 2.0C | 2.5C | 3.0C | 3.5C | 4.0C | 4.5C |
| Anode Porosity 0.15 | 99 | 86 | 82 | 67 | 36 | 22 | 15 |
| 0.2 | 99 | 86 | 83 | 80 | 73 | 36 | 25 |
| 0.3 (Baseline) | 99 | 87 | 84 | 81 | 78 | 58 | 41 |
| 0.4 | 99 | 87 | 84 | 81 | 78 | 75 | 54 |

Electrode thickness is changed accordingly to keep same amount of active material.

| Percentage of CC (Const. Current) Capacity (%) | Charge Current, C-rate (1C=2.3mA/cm2) | | | |
|---|---|---|---|---|
| | 0.5C | 2.0C | 3.5C | 4.0C |
| Cathode Porosity 0.1 | 98 | 84 | 78 | 57 |
| 0.15 (Baseline) | 99 | 87 | 78 | 58 |
| 0.2 | 99 | 88 | 80 | 56 |
| 0.3 | 99 | 89 | 81 | 53 |

Fig. 20

Electrode Tortuosity vs. Charge Rate Capability
(Green) or Li Deposition Starts (Orange)

| Percentage of CC (Const. Current) Capacity (%) | Charge Current, C-rate (1C=2.3mA/cm2) | | | | |
|---|---|---|---|---|---|
| | 0.5C | 2.0C | 3.0C | 3.5C | 4.0C |
| Anode Tortuosity — 1.2 (Baseline) | 99 | 87 | 81 | 80 | 58 |
| 1.3 | 99 | 87 | 81 | 78 | 52 |
| 1.5 | 99 | 86 | 80 | 67 | 42 |
| 1.7 | 99 | 85 | 79 | 51 | 33 |

| Percentage of CC (Const. Current) Capacity (%) | Charge Current/C-rate (1C=2.3mA/cm2) | | | | |
|---|---|---|---|---|---|
| | 0.5C | 2.0C | 3.0C | 3.5C | 4.0C |
| Cathode Tortuosity — 1.2 | 99 | 88 | 82 | 80 | 62 |
| 1.3 (Baseline) | 99 | 87 | 81 | 78 | 58 |
| 1.5 | 98 | 80 | 76 | 71 | 47 |
| 1.7 | 97 | 80 | 64 | 52 | 38 |

Fig. 21

Baseline Cell Parameters

| | Thickness (um) | Porosity (%) | Binder + Conductor (%) | Active Material (%) |
|---|---|---|---|---|
| Anode | 61 | 30 | 5(wt) or 4.3 (vol) | 95(wt) or 65.7(vol) |
| Separator | 25 | 40 | N/A | N/A |
| Cathode | 74 | 15 | 8.5(wt) or 13.2(vol) | 91.5(wt) or 71.8(vol) |

Initial SOC=0%
Environment T=25oC
Current-rate= 1C=2.3mAh/cm2
Cell voltage limit: 3-4.2V

Fig. 22

BATTERY SEPARATORS, ELECTRODES, CELLS, LITHIUM BATTERIES AND RELATED METHODS

PRIORITY CLAIM

This application claims the benefit of and priority under 35 U.S.C. § 119(e)(1) to U.S. Provisional Patent Application No. 62/473,596 filed on Mar. 20, 2017. This U.S. Provisional Patent Application is hereby incorporated by reference herein in its entirety.

FIELD

In accordance with at least selected embodiments, the present disclosure or invention is directed to novel or improved separators, battery separators, electrodes, cathodes, anodes, batteries, cells, systems, and/or methods of design, understanding, manufacture and/or use of such separators, battery separators, electrodes, cathodes, anodes, cells, systems, and/or the like for lithium batteries, especially secondary lithium batteries, such as secondary lithium ion batteries, and/or CE, ESS, and/or EDV batteries. In accordance with at least certain embodiments, the present disclosure or invention is directed to new or improved ways to look at or to define tortuosity, porosity, lithium deposition, and cell design using such new thinking, definitions, and/or data. In addition, disclosed herein are methods, systems and battery components for enhancing battery life, reducing battery failure, reducing dendrites, reducing lithium deposition, retaining charge and discharge rates, improved configurations, improved performance, and/or the like.

BACKGROUND

A need exists for improved battery separators, particularly lithium ion battery separators, that, among other things, block dendrites and do not melt even at high temperatures.

In lithium ion batteries, carbonaceous materials have been commonly used as anode materials for lithium ion batteries. Although the energy densities of the carbonaceous materials are very high, the charge and discharge voltages are very close to that of lithium deposition. Thus, lithium deposition could occur by overpotential, especially under a high charge rate, which causes a large polarization. The deposition of lithium metal within the battery causes a serious safety concern, which may lead to a thermal event, runaway or to an explosion. Thus, there is a need for lithium ion batteries or cells where lithium deposition does not occur even at high charge rates.

SUMMARY

In accordance with at least selected embodiments, the present disclosure or invention may address the above needs, issues or problems, and/or which is directed to novel or improved separators, battery separators, electrodes, cathodes, anodes, batteries, cells, systems, and/or methods of design, understanding, manufacture and/or use of such separators, battery separators, electrodes, cathodes, anodes, cells, systems, and/or the like for lithium batteries, especially secondary lithium batteries, such as secondary lithium ion batteries, and/or CE, ESS, and/or EDV batteries. In accordance with at least certain embodiments, the present disclosure or invention is directed to new or improved ways to look at or to define tortuosity, porosity, lithium deposition, and cell design using such new thinking, definitions, and/or data. In addition, disclosed herein are methods, systems and battery components for enhancing battery life, reducing battery failure, reducing dendrites, reducing lithium deposition, retaining charge and discharge rates, improved configurations, improved performance, and/or the like.

In one aspect, this application is directed to an improved battery separator. The improved separator has at least one of the following properties when wet with electrolyte: has no or low volume; has no or low mass; soaks as much liquid electrolyte as possible; blocks or removes any harmful substances in the electrolyte; never melts at any high temperature; does not react with the cathode or the anode under any conditions; has a mechanical strength equal to or greater than steel; is an electronic insulator under any conditions; blocks metal dendrite growth. In some embodiments, the separator has 1 or 1 or more of the foregoing properties. In some embodiments, the separator has 2 or 2 or more of the foregoing. In some embodiments, the separator has 3 or 3 or more of the foregoing properties. In some embodiments, the separator has 4 or 4 or more of the foregoing. In some embodiments, the separator has 5 or 5 or more of the foregoing properties. In some embodiments, the separator has 6 or 6 or more of the foregoing properties. In some embodiments, the separator has 7 or 7 or more of the foregoing properties. In some embodiments, the separator has 8 or 8 or more of the foregoing properties. In some embodiments, the separator has all 9 of the foregoing properties or at least all 9 of the foregoing properties.

In some embodiments, the battery separator described hereinabove, is a porous, microporous, or nanoporous battery separator, and the pores of the battery separator are filled with an ionic conductive medium. In some embodiments, the battery separator having its pores filled with an ionic conductive medium conducts lithium ions when it is dry (no electrolyte added), when it is wet with electrolyte, or both when it is dry (no electrolyte added) and when it is wet with electrolyte.

In another aspect, an energy cell capable of being charged at a charge rate greater than or equal to 3.0 C (1 C=2.3 mA/cm$^2$) without lithium deposition. In some embodiments, the cell may be capable of being charged at a charge rate that is greater than or equal to 3.5 C, greater than or equal to 4.0 C, greater than or equal to 4.5 C, or greater than or equal to 3.0 C, but less than 5.0 C.

The energy cell comprises at least the following: an anode that comprises lithium; and a cathode.

In some embodiments, the anode that comprises lithium has a thickness from about 50 to about 200 microns. The thickness may also be from about 60 to about 200 microns, or about 60 to about 125 microns. The porosity of the anode may be, in some embodiments, greater than or equal to 15%, greater than or equal to 20%, greater than or equal to 30%, or greater than or equal to 40%. In some embodiments, the anode porosity may be greater than or equal to 15%, but less than or equal to 50%. The anode tortuosity may be, in some embodiments, less than or equal to 2.0, less than or equal to 1.7, less than or equal to 1.5, less than or equal to 1.3, or less than or equal to 1.2. In some embodiments, the toruosity is between 1.0 and 2.0, preferably between 1.2 and 2.0. Even more preferably, the anode tortuosity may be greater than or equal to 1.2, but less than or equal to 1.3.

In some embodiments, the anode that comprises lithium is made from at least one material selected from the group consisting of: lithium cobalt oxide (LCO); lithium manganese oxide (LMO); lithium iron phosphate (LFP); (Li(N-

$i_xMn_yCo_z)O_2)$, where $0.33>x>0.9$ and $x+y+z=1$; NCA (Li $(Ni_xCo_yAl_z)O_2)$, where $0.8>x>0.9$ and $x+y+z=1$; and combinations thereof.

In some embodiments, the cathode of the energy cell described herein has a thickness from about 50 to about 200 microns, from about 75 to about 200 micron, or from about 75 to about 150 microns. The porosity of the cathode may be, in some embodiments, greater than or equal to 10%, greater than or equal to 15%, greater than or equal to 20%, greater than or equal to 30%, or greater than or equal to 10%, but less than 40%. The tortuosity of the cathode, may be, in some embodiments, less than or equal to 2.0, less than or equal to 1.7, less than or equal to 1.5, less than or equal to 1.3, or less than or equal to 1.2. In some preferred embodiments, the cathode tortuosity may be greater than or equal to 1.0, but less than or equal to 2.0. Even more preferably, the cathode tortuosity may be greater than or equal to 1.2, but less than or equal to 1.5.

The cathode of the energy cell may be made of, in some embodiments, at least one material selected from the group consisting of: natural graphite; artificial graphite; amorphous carbon; an alloy comprising tin and/or silicon; a spinet lithium titanium oxide; and combinations thereof.

Further, in addition to an anode comprising lithium and a cathode, the energy cell described herein may comprise an electrolyte. The electrolyte may be selected from the group consisting of: ethylene carbonate (EC); ethyl methyl carbonate (EMC); diethyl carbonate (DEC); dimethyl carbonate (DMC); propylene carbonate (PC); and combinations thereof. In some embodiments, the electrolyte may comprise an electrolyte additive.

In some further embodiments, the energy cell described him may comprise a separator, including the improved separator described herein. For example, the energy cell may comprise an anode comprising lithium, a cathode, and a separator. In some other embodiments, the energy cell may comprise an anode comprising lithium, a cathode, an electrolyte, and a separator.

In some embodiments, the energy cell may be a primary or secondary energy cell.

In another aspect, an anode comprising lithium is described herein. The anode comprising lithium may be used in the energy cell described herein. In some embodiments, the anode that comprises lithium has a thickness from about 50 to about 200 microns. The thickness may also be from about 60 to about 200 microns, or about 60 to about 125 microns. The porosity of the anode may be, in some embodiments, greater than or equal to 15%, greater than or equal to 20%, greater than or equal to 30%, or greater than or equal to 40%. In some embodiments, the anode porosity may be greater than or equal to 15%, but less than or equal to 50%. The anode tortuosity may be, in some embodiments, less than or equal to 2.0, less than or equal to 1.7, less than or equal to 1.5, less than or equal to 1.3, or less than or equal to 1.2. In some embodiments, the toruosity is between 1.0 and 2.0, preferably between 1.2 and 2.0. Even more preferably, the anode tortuosity may be greater than or equal to 1.2, but less than or equal to 1.3.

In some embodiments, the anode that comprises lithium is made from at least one material selected from the group consisting of: lithium cobalt oxide (LCO); lithium manganese oxide (LMO); lithium iron phosphate (LFP); (Li(N-$i_xMn_yCo_z)O_2)$, where $0.33>x>0.9$ and $x+y+z=1$; NCA (Li $(Ni_xCo_yAl_z)O_2)$, where $0.8>x>0.9$ and $x+y+z=1$; and combinations thereof.

In some embodiments, voids in the cathode may comprise an ionic conductive medium.

In another aspect, a cathode that may be used in the energy cell described herein is disclosed. In some embodiments, the cathode has a thickness from about 50 to about 200 microns, from about 75 to about 200 micron, or from about 75 to about 150 microns. The porosity of the cathode may be, in some embodiments, greater than or equal to 10%, greater than or equal to 15%, greater than or equal to 20%, greater than or equal to 30%, or greater than or equal to 10%, but less than 40%. The tortuosity of the cathode, may be, in some embodiments, less than or equal to 2.0, less than or equal to 1.7, less than or equal to 1.5, less than or equal to 1.3, or less than or equal to 1.2. In some preferred embodiments, the cathode tortuosity may be greater than or equal to 1.0, but less than or equal to 2.0. Even more preferably, the cathode tortuosity may be greater than or equal to 1.2, but less than or equal to 1.5.

The cathode may be made of, in some embodiments, at least one material selected from the group consisting of: natural graphite; artificial graphite; amorphous carbon; an alloy comprising tin and/or silicon; a spinel lithium titanium oxide; and combinations thereof.

In some embodiments, voids of the cathode may comprise an ionic conductive medium (ICM).

BRIEF DESCRIPTION OF DRAWINGS

FIG. 1 depicts ionic transport, toruosity, and Gurley.

FIG. 2 depicts ionic transport and tortuosity.

Figure 3:
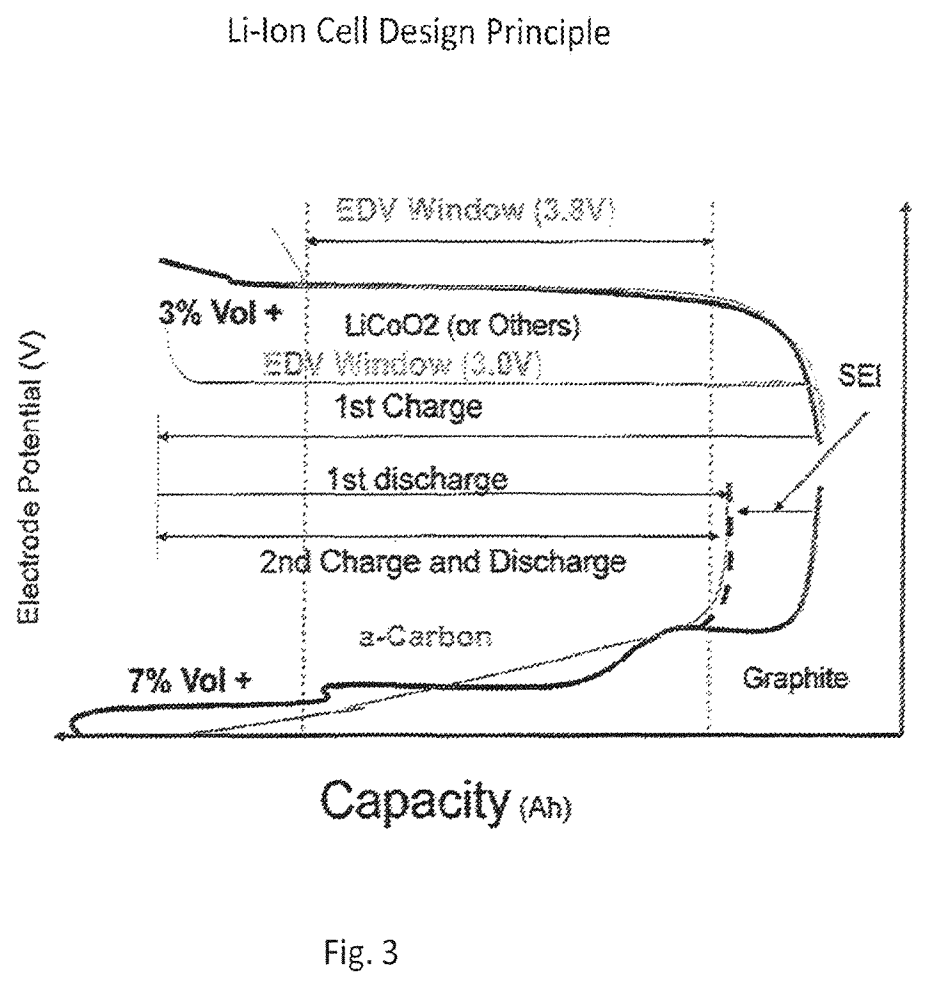

FIG. 3 depicts an exemplary Li-ion cell design principle.

FIG. 4 depicts Li-ion cell polarization.

FIG. 6 depicts an electrochemical model, a thermal model, and a chemical model.

FIG. 7 depicts basic electrochemical equations.

FIG. 19 is a chart showing when Li deposition starts when different charge rates are used for electrodes having different thicknesses.

FIG. 20 is a chart showing when Li deposition starts when different charge rates are used for electrodes having different porosity values.

FIG. 21 is a chart showing when Li deposition starts when different charge rates are used for electrodes having different tortuosity values.

FIG. 22 is a chart including baseline cell parameters for a cell not having Li deposition.

DETAILED DESCRIPTION

Figure 5:
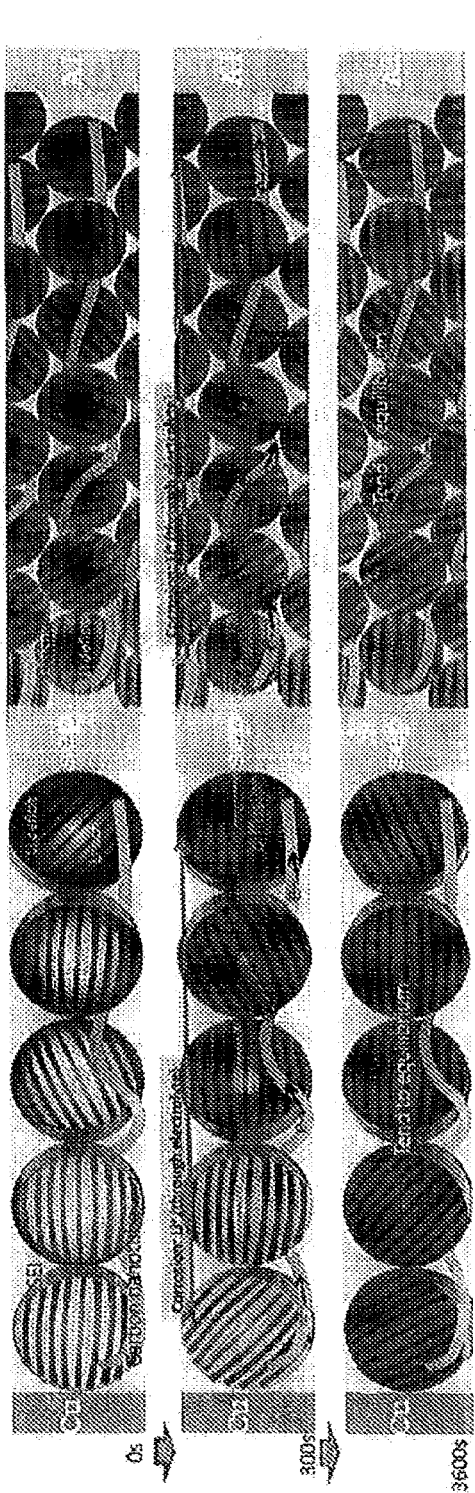
FIG. 5 is an illustration of Li concentration in electrode particles after high current discharge.
Figure 8:
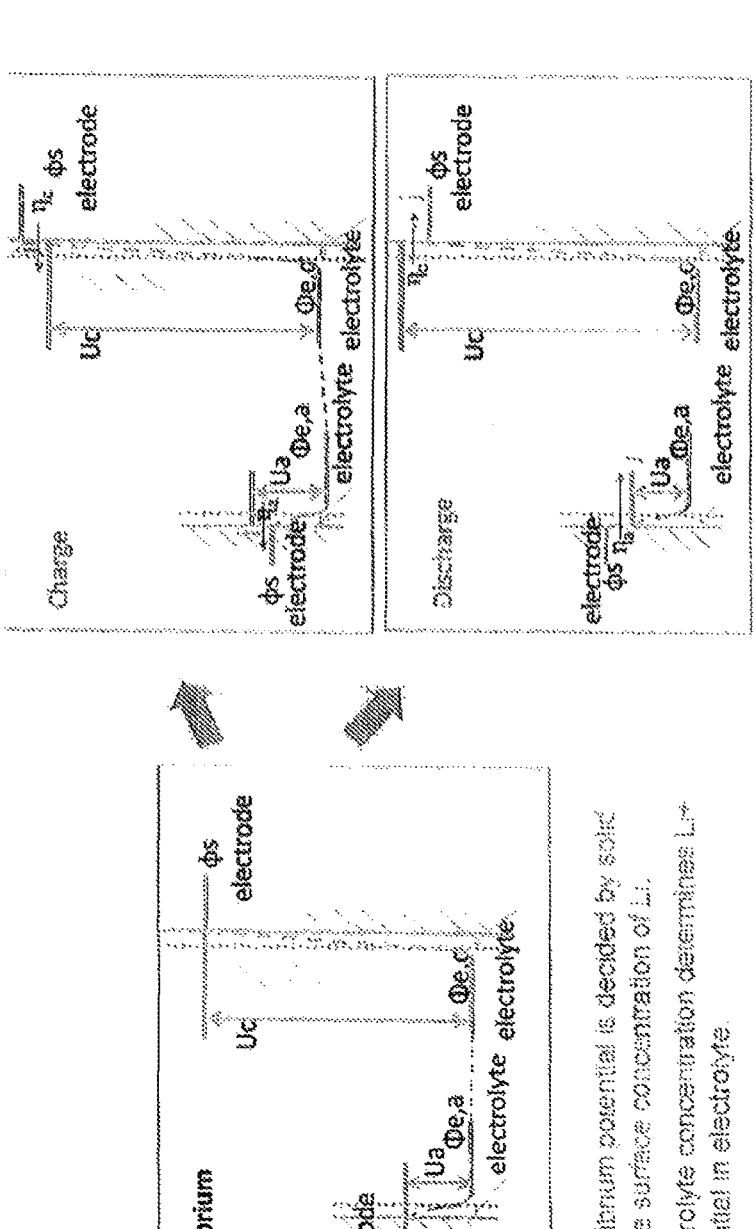
FIG. 8 depicts a review of potentials in Li-ion at equilibrium, charge, and discharge.
Figure 9:
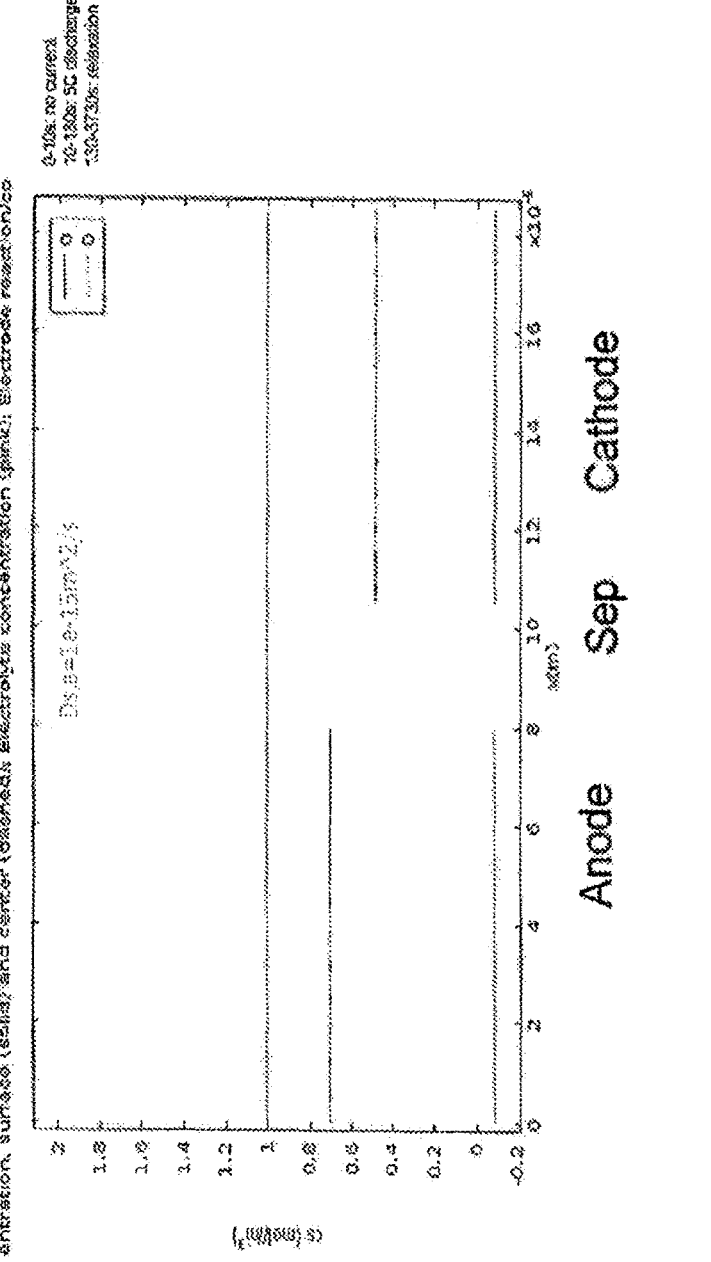
FIG. 9 is a graph of Lithium concentration distribution in a porous li-ion cell 100% following Faradaic reaction law.
Figure 10:
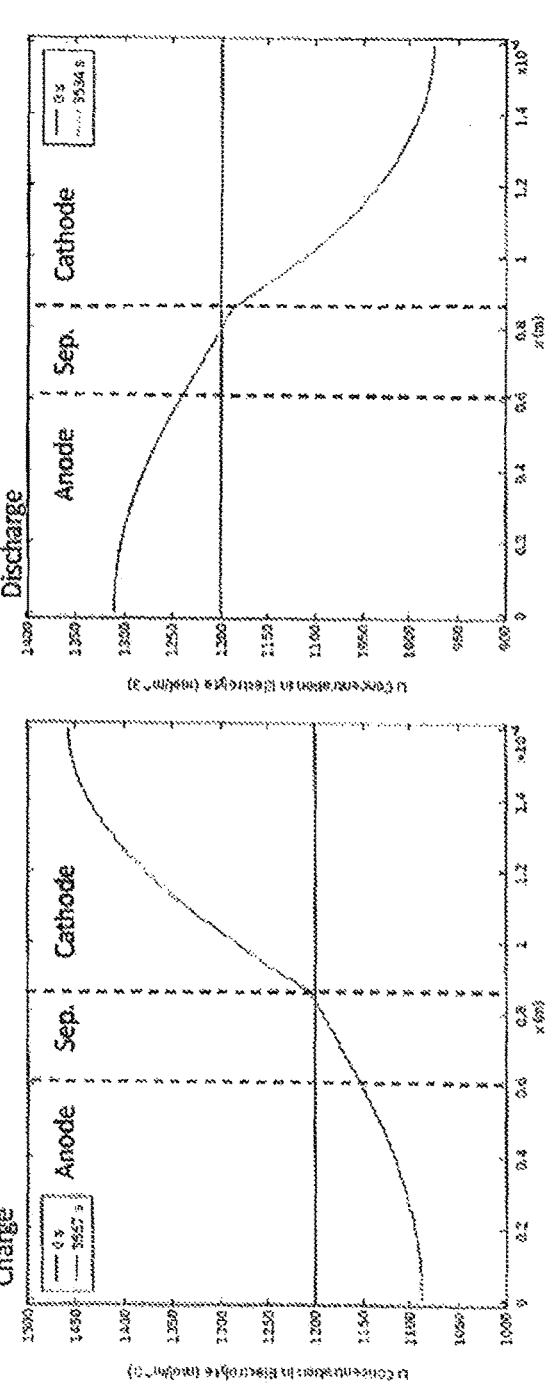
FIG. 10 include graphs showing lithium concentration in the electrolyte at charge and discharge.
Figure 11:
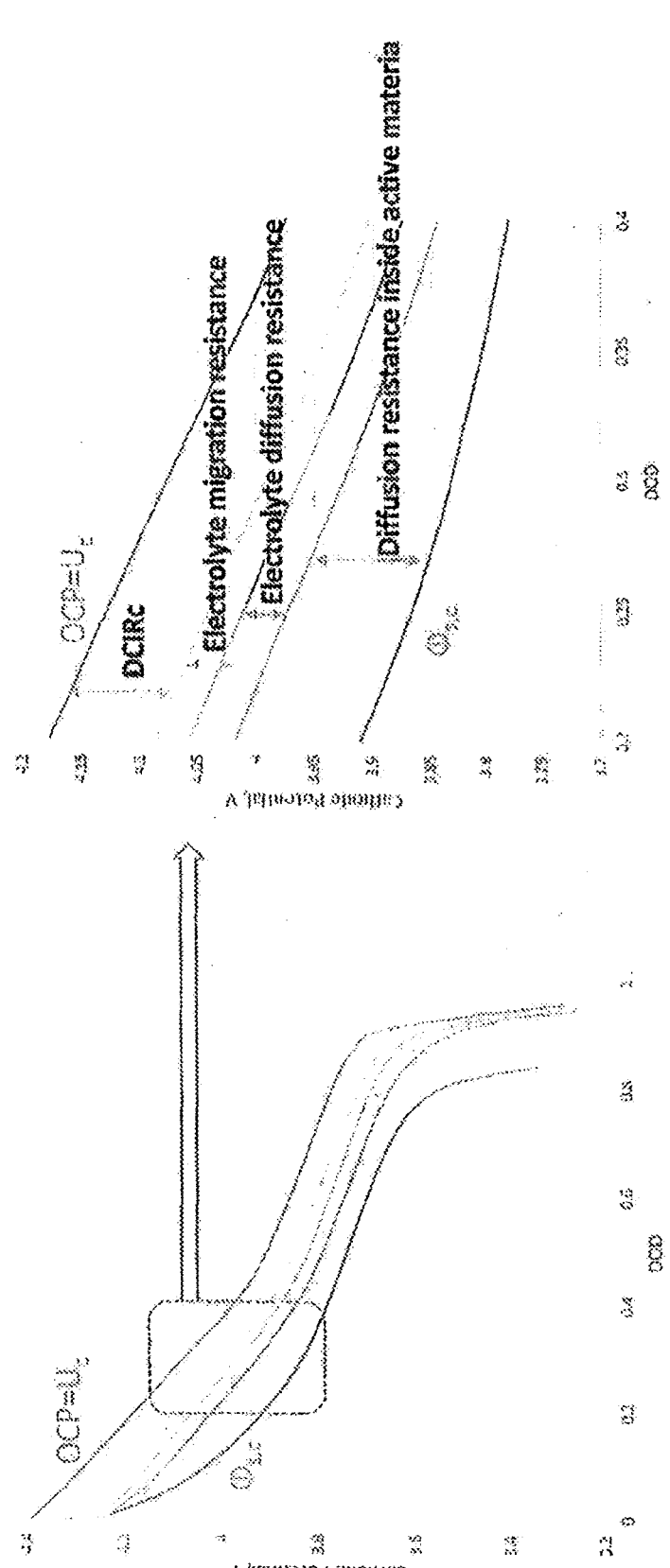
FIG. 11 includes a graph and a zoomed in portion of that graph showing cathode potential drop at discharge.
Figure 12:
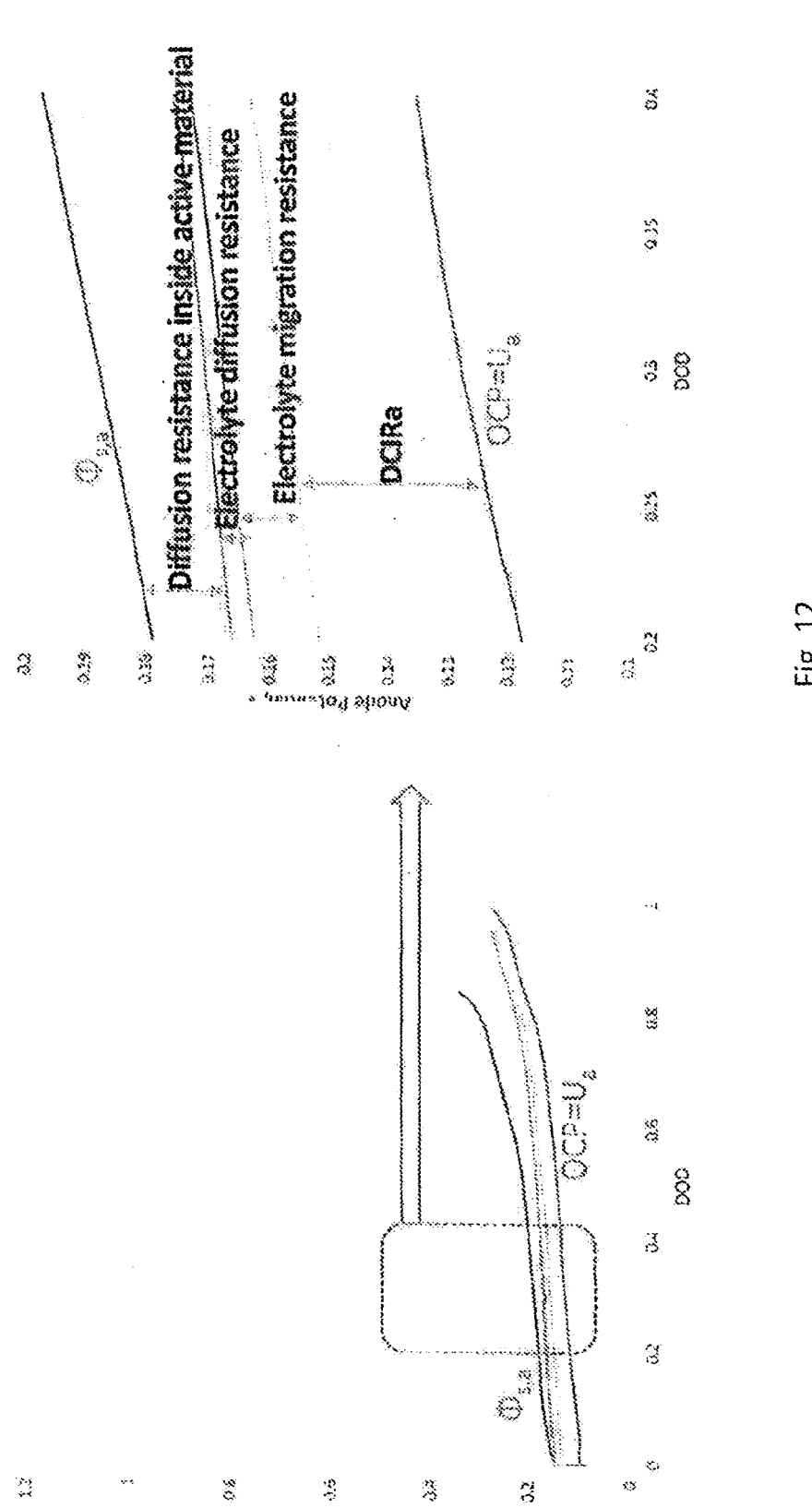
FIG. 12 includes a graph and a zoomed in portion of that graph showing anode potential increase at 4 C discharge.
Figure 13:
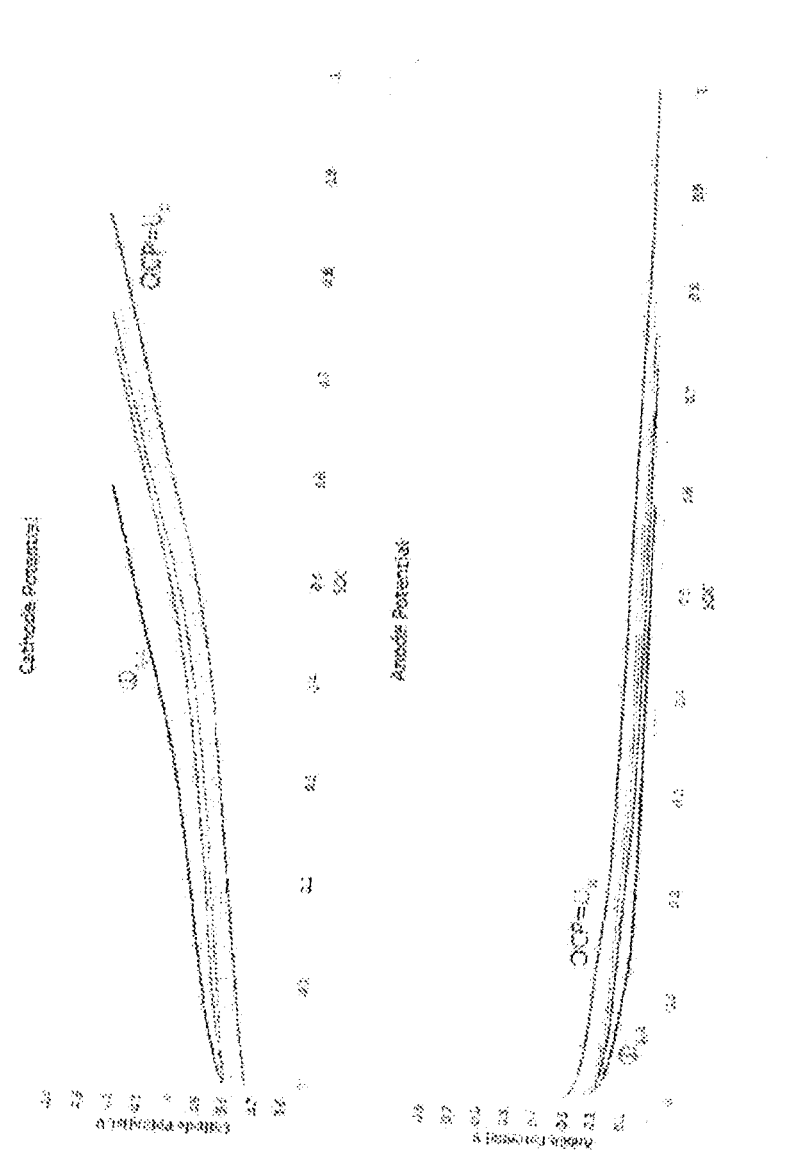
FIG. 13 includes two graphs showing electrode potential drop at the anode at 4 C charge.
Figure 14:
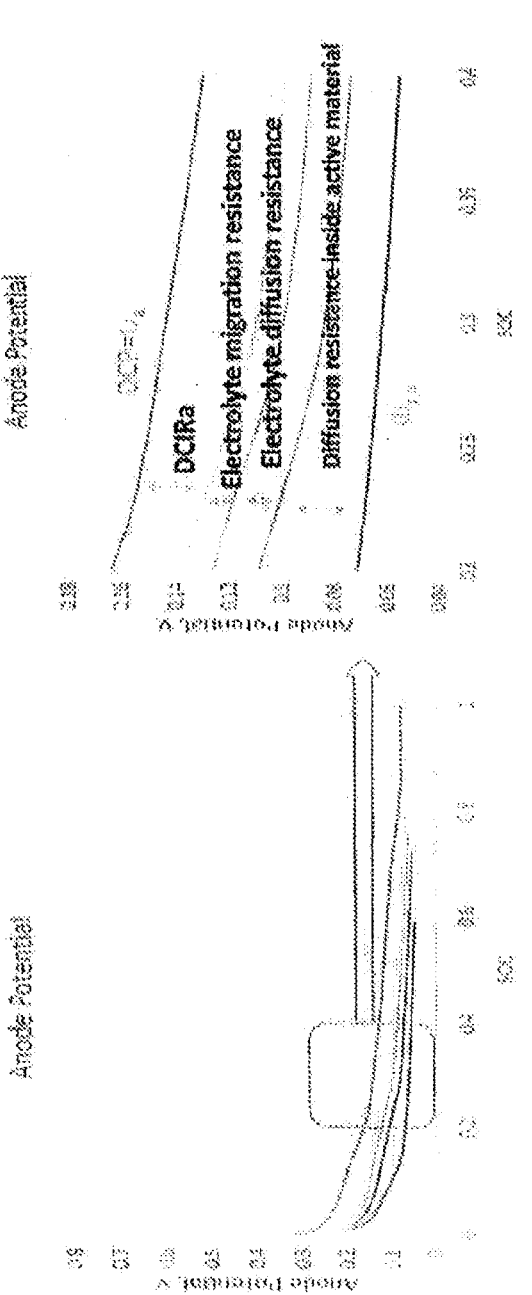
FIG. 14 includes a graph and a portion of that graph showing anode potential drop at 4 C charge.
Figure 15:
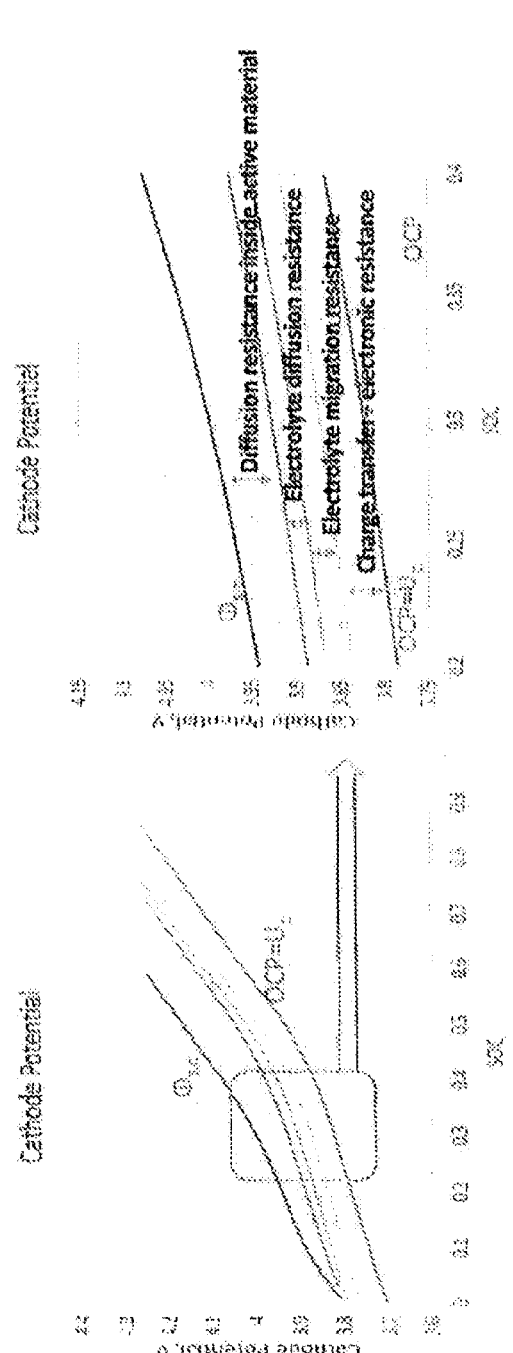
FIG. 15 includes a graph and a zoomed in portion of that graph showing cathode potential increase at 4 C charge.
Figure 16:
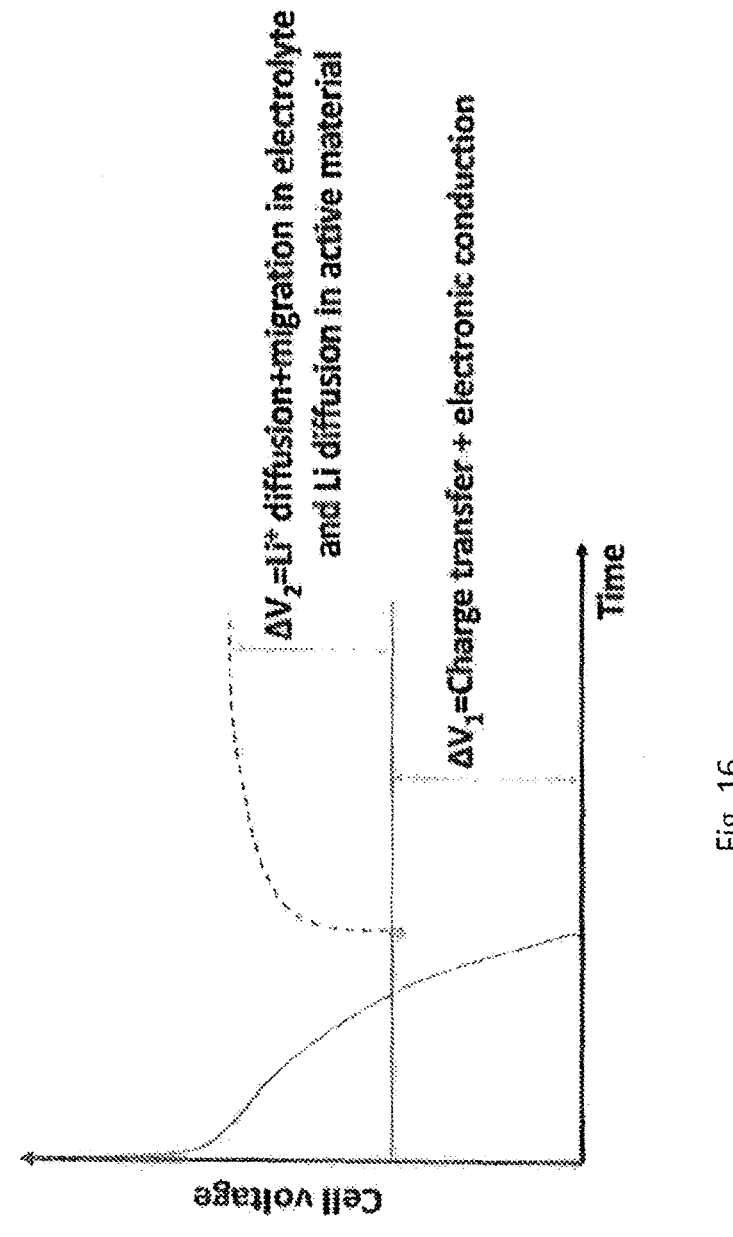
FIG. 16 includes a graph from a DCIR measurement showing cell voltage over time.

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In accordance with at least selected embodiments, described herein is an improved battery separator, an improved energy cell optionally comprising the improved battery separator, and/or improved anodes and cathodes, optionally for use with the improved battery separator or with the improved energy cell described herein.

Battery Separator

Unless described otherwise in particular embodiments, the membrane or battery separator described herein is not so limited. In some embodiments, the battery separator may be an improved battery separator comprising a porous membrane that has at least one of the following properties when wet with electrolyte: has no or low volume; has no or low mass; soaks as much liquid electrolyte as possible; blocks or removes any harmful substances in the electrolyte; never melts at any high temperature; does not react with the cathode or the anode under any conditions; has a mechanical strength equal to or greater than steel; is an electronic insulator (no electronic conduction) under any conditions; blocks metal dendrite growth.

One way of imparting some of the foregoing properties is by incorporating a ceramic into the battery separator. For example, in some embodiments, a ceramic coating may be applied to one or more surfaces of the porous membrane that is part of the battery separator. In some embodiments, a ceramic material may be incorporate into the microporous membrane. For example, if the membrane is formed by a dry process such as the Celgard® dry-stretch process, a ceramic material may be extruded with the polymer, e.g., a polyolefin polymer, used to form the membrane. In some embodiments, if the membrane is a multilayer membrane formed by a dry process such as the Celgard® dry-stretch process, the ceramic material may be in only some of the layers and not others. The ceramic material may be incorporated into some of the layers, but not others, by extruding a ceramic material with the polymer used to form some of the layers, but not with the polymer used to form others of the layers.

Many ceramics can conduct ions even better than liquid. See, for example, the disclosure of U.S. Pat. No. 6,432,586, which is incorporated by reference herein in its entirety. Ceramics can also block or remove harmful substances in an electrolyte. Ceramics will not melt at very high temperatures and will not react with most anode or cathode materials under most conditions. Ceramics will be mechanically strong. Thus, ceramics are one preferred material for providing some of the properties of the improved battery separator described herein.

Porous Membrane

Unless described otherwise in particular embodiments, the porous membrane described herein is not limited. It may be nanoporous, microporous, or macroporous. In some preferred embodiments, the porous membrane is microporous.

Microporous, as used herein, means that the membrane comprises micro-pores or micrometer sized pores. In some embodiments, the average pore size of the microporous membrane is less than 2 microns, and in preferred embodiments, the average pore size is less than 1 micron. In some embodiments, the average pore size pore size is between 0.01 and 1 micron, preferably between 0.01 to 0.08 microns, more preferably between 0.01 and 0.06 microns, and in some embodiments, from 0.01 to 0.04, from 0.01 to 0.03, or from 0.1 to 0.02 microns.

In some preferred embodiments, the microporous membrane itself, e.g., without any coating such as a ceramic coating thereon, has a thickness ranging from 2 to 50 microns, from 4 to 40 microns, from 4 to 30 microns, from 4 to 20 microns, from 4 to 10 microns, or less than 10 microns. Thickness may be measured in micrometers, μm, using the Emveco Microgage 210-A micrometer thickness tester and test procedure ASTM D374. Thin microporous membranes are preferable for some applications. For example, when used as a battery separator, a thinner separator membrane allows for use of more anode and cathode material in the battery, and consequently, a higher energy and higher power density battery results.

In some preferred embodiments, the microporous membrane has a porosity, e.g., a surface porosity, of about 40 to about 70%, sometimes about 40 to about 65%, sometimes about 40 to about 60%, sometimes about 40 to about 55%, sometimes about 40 to about 50%, sometimes about 40 to about 45%, etc. In some embodiments, if it is desirable for a particular application, the porosity may be higher than 70% or lower than 40%, but the range of 40 to 70% is a working range for battery separators, which is one way the disclosed microporous membranes may be used. Porosity is measured using ASTM D-2873 and is defined as the percentage of void space, e.g., pores, in an area of the microporous membrane, measured in the Machine Direction (MD) and the Transverse Direction (TD) of the substrate.

In some preferred embodiments, the microporous membrane may have a JIS Gurley ranging from 50 to 300, 75 to 300, and or 100 to 300. However, unless described otherwise in particular embodiments, the JIS Gurley value is not so limited and higher, e.g., above 300, or lower, e.g., below 50, JIS Gurley values may be desirable for different purposes. Gurley is defined herein as the Japanese Industrial Standard (JIS Gurley) and is measured herein using the OHKEN permeability tester. JIS Gurley is defined as the time in seconds required for 100 cc of air to pass through one square inch of film at a constant pressure of 4.9 inches of water.

The microporous membrane may be manufactured in any manner not inconsistent with the stated goals herein. For example, in some preferred embodiments, the microporous membrane is a dry-process microporous membrane, meaning that the film was formed without the use of a solvent. An exemplary dry-process is a dry-stretch process comprising, consisting of, or consisting essentially of the steps of extruding a polymer to form a nonporous precursor film and stretching the precursor film to, among other things, form pores. An exemplary dry-stretch process is the Celgard® dry-stretch process. The extrusion step may, in some embodiments, include co-extrusion where two or more polymeric mixtures, which may be the same as each other or different, are coextruded. In other embodiments, the microporous membrane may be made by a particle stretch manufacturing process, and a beta-nucleated biaxially-oriented (BN-BOPP) manufacturing process. Alternatively, in other embodiments, the porous substrate may be manufactured by a wet process, which may involve the use of solvents and/or oils, sometimes known as a phase separation or extraction process, of Celgard Korea, Limited of South Korea, Asahi Kasei of Japan and/or Tonen of Japan. Alternatively, in other embodiments, the microporous membrane may be a woven or non-woven type membrane. For example, in some embodiments, the microporous membrane may be formed using an electrospinning coating process. The electrospinning process provides a method of applying a polymer composition in the form of nanoscale fibers without the nanoscale fibers themselves required to be porous. The spaces between the fibers provide the necessary openings or porosity in the electrospun coating or layer.

In some embodiments, the microporous membrane may be a monolayer, bilayer, or multilayer membrane. The term "layer" as used herein (e.g., in the term "monolayer," "bilayer" or "multilayer") includes a mono-extruded or mono-cast layer having a thickness from 2 to 50 microns. A monolayer may be a mono-extruded or mono-cast layer having a thickness from 2 to 50 microns. As understood by those skilled in the art, a mono-extruded layer is a layer that was extruded by itself, not with any other layers. Also, the layers of a co-extruded bi-layer or multi-layer microporous membranes are each considered to be a "layer" as used herein. The number of layers in coextruded bi-layer will be two and the number of layers in a co-extruded multi-layer film will be three or more. The exact number of layers in a bi-layer or multi-layer co-extruded film is dictated by the die design and not necessarily the materials that are co-extruded to form the co-extruded film. For example, a co-extruded bi-, or multi-layer film may be formed using the same material to form each of the two or three or more layers, and these layers will still be considered to be separate layers even though each is made of the same material. The exact number, again, will be dictated by the die design. The layers of the co-extruded bi-, or multi-layer films each may have a thickness of 0.1 to 20 microns, preferably 0.1 to 5 microns, most preferably 0.1 to 3 microns, 0.1 to 2 microns, 0.1 to 1 microns, 0.1 to 0.9 microns, 0.1 to 0.8 microns, 0.1 to 0.7 microns, 0.1 to 0.6 microns, 0.1 to 0.5 microns, 0.1 to 0.4 microns, 0.1 to 0.3 microns, or 0.1 to 0.2 microns. Again, a monolayer microporous membrane consists of a single extruded or cast layer that was not extruded or cast along with any other layers. The monolayer may have a thickness from 2 to 50 microns, for example.

In other embodiments, the microporous membrane may be a bilayer microporous membrane, which consists of two single extruded (mono-extruded) or cast (mono-cast) films that have been laminated together or which consists of a coextruded bilayer, which is manufactured by co-extruding two polymeric compositions, that are different or the same, to form a co-extruded film. The total thickness of the bilayer microporous membrane (different from the thickness of the individual layers making up the bilayer membrane) may be, for example, 0.2 to 50 microns. The thicknesses of the two films making up the bilayer microporous membrane may be from 0.1 to 25 microns. The co-extrusion method allows for the formation of thinner layers than the extrusion plus lamination method.

In other embodiments, the microporous membrane may be a multilayer microporous membrane, e.g., a membrane comprising three or more layers. The multilayer microporous membrane may be a trilayer, tetralayer, pentalayer, hexalayer, heptalayer, octalayer, nonalayer, or decalayer membrane. In other embodiments, the membrane may comprise 11 to 100 layers. The multilayer microporous membrane may be formed by individually forming (by extrusion (e.g., mono-extrusion) or casting (e.g., mono-casting), for example) three or more monolayers and then laminating them together. In these embodiments, the thickness of the multilayer microporous membrane may be from 6 to 100 microns, with the thickness of each layer of the multilayer microporous membrane being from 2 to 30 microns. In other embodiments, the multilayer microporous membrane may be formed by co-extruding three or more polymeric compositions that may be the same or different. In this embodiment, the thickness of the multilayer microporous membrane may be as thin as 1 micron or as thick as 50 microns. The individual layers may have a thickness of from 0.1 to 20 microns.

In other embodiments, the multilayer microporous membrane may be formed by a combination of the following: a step of forming a monoextruded or monocast layer; a step of co-extruding two or more layers; and a lamination step. For example, a monolayer may be extruded or cast, then wo polymeric compositions may be extruded to form a co-extruded bilayer, and then, the monolayer and the bilayer may be laminated together to form a multilayer microporous membrane. In some embodiments, two or three or more co-extruded bilayers or multilayers are laminated together to form the multilayer microporous membrane. In some embodiments, the multilayer microporous membrane may be formed using a blown-film (or bubble) co-extrusion method, wherein the bubble is collapsed on itself. This method may form multilayer microporous membranes having 2 (a bilayer), 4, 6, 8, 10, 12, or other even numbers of layers. This method does not form microporous membranes having 3, 5 (pentalayer), 7, 9, 11, or other odd numbers of layers.

For example, the microporous membrane may be a microporous membrane as described in PCT publication WO/2017/083633, which is incorporated herein by reference in its entirety.

Lamination, in the embodiments described herein, may involve applying at least one of heat, pressure, or a combination thereof, to attach separate films or layers. The films or layers that are laminated to form the bilayer or multilayer microporous membranes described herein may be at least one of annealed, MD stretched, TD stretched, calendered, heat set, and combinations thereof before and/or after lamination. Alternatively, or additionally, the laminated formed by laminating these films or layers may be at least one of annealed, MD-stretched, TD-stretched, calendered, and combinations thereof. In this case, at least one of annealing, MD-stretching, TD-stretching, and calendering occurs after lamination.

Unless described otherwise in particular embodiments, the composition of the porous membrane described herein is not so limited. In some embodiments, the porous membrane may be composed of any extrudable polymer. In some preferred embodiments, the extrudable polymer is a polyolefins, including polyethylene, polypropylene, and mixtures thereof.

In some embodiments, the pores (e.g., nanopores, micropores, or macropores) of the porous membrane described herein may be filled with an ionic conductive medium (ICM). An ICM comprises a polymer and a solvent electrolyte. For example, the ICM may comprise a polymer such as PVDF and an electrolyte. Lithium ions will be conducted in the ICM or liquid electrolyte in the pores. Even when the microporous membrane is not wet with electrolyte (is dry), it will conduct ions if the pores are filled with ICM. The microporous membrane with polymer (e.g., polymer from the ICM) in the pores has an infinite Gurley (10,000 or higher). There are various electrolytes, including the following: Pure Liquid electrolyte—Many can be soaked into polymers films (Gurley=infinity) to form Gel electrolyte and many can be soaked into pores of the porous film (Gurley with certain value). Battery will function well with both types of the polymer film. In the real world, when liquid electrolyte meet polymer, at least a portion of the liquid electrolyte will somehow soak into (wet, swell, or gel) the polymer. Depending on the amount liquid electrolyte soaked in, we can call them Gel electrolyte, or polymer electrolyte. A 100% "pure liquid electrolyte" (may not often exist in a cell due to polymer soaking up liquid). Our new mathematical definition of tortuosity for ICM may describe the performance of the layer as a whole.

As explained in FIG. 1, Li ion transport in an ionic conductive medium is totally different from fluid flow, e.g., fluid flow of a liquid electrolyte, through a porous material like the porous membrane described herein. The ionic conductive medium does not flow. Tortuosity is the ratio of the resistivity of a separator membrane ($\rho_s$) to that of the electrolyte ($\rho_e$) shown as the MacMullin number ($N_m$) shown in Formula (1) below, where $\varepsilon$ is the porosity.

$$(\rho_s)/(\rho_e)=N_m=\tau^2/\varepsilon \qquad (1)$$

The ionic conductive medium may be at least one of a solid state electrolyte, a gel electrolyte or a liquid electrolyte uptake polymer having infinite Gurley, but still being able to transport ions and its $\tau$ or tortuosity always equals 1. Tortuosity ($\tau$) is represented by Formula (2) below:

$$\tau=L/x \qquad (2)$$

In Formula (2), L is the actual length of a pore and x is the straight-line distance from one end of the pore to another. Both L and x are shown in FIG. 1.

Energy Cell

Unless described otherwise in particular embodiments, the energy cell described herein is not so limited and may be either a primary or a secondary energy cell. For example, in preferred embodiments, the energy cell is an electrochemical energy cell. The energy cell may also be a primary or a secondary cell. As understood by those skilled in the art, a primary cell is a battery that is designed to be used once, and not recharged with electricity and reused like a secondary cell or rechargeable battery. In general, the electrochemical reaction in a primary cell is not reversible, while the electrochemical reaction in a secondary cell is. In preferred embodiments, the energy cell herein is a secondary electrochemical energy cell.

The structure of the energy cell is also not so limited. It may comprise, consist of, or consist essentially of an anode, a cathode, an electrolyte, and a separator. In some embodiments, the energy cell may comprise, consist of, or consist essentially of an anode, a cathode, and a solid electrolyte. In some embodiments, the energy cell may comprise, consist of, or consist essentially of an anode, a cathode, a separator, and an electrolyte. The separator may be a separator as described herein.

In at least one preferred embodiment, the energy cell herein comprises, consists of, or consists essentially of the following: an anode that comprises lithium, a cathode, and at least one of an electrolyte and a separator, a solid electrolyte and a separator, or just a solid electrolyte.

Unless described otherwise in particular embodiments, the material of the anode is not so limited and can be any material known to be or found to be acceptable for use as an anode material. In some preferred embodiments, the anode material is a material known to be or found to be acceptable for use as an anode material that also comprises lithium. For example, the anode material comprising lithium may be at least one selected from the group consisting of: lithium cobalt oxide (LCO); lithium manganese oxide (LMO); lithium iron phosphate (LFP); ($\text{Li}(\text{Ni}_x\text{Mn}_y\text{Co}_z)\text{O}_2$), where $0.33>x>0.9$ and $x+y+z=1$; NCA ($\text{Li}(\text{Ni}_x\text{Co}_y\text{Al}_z)\text{O}_2$), where $0.8>x>0.9$ and $x+y+z=1$; and combinations thereof.

The material of the cathode is also not so limited and can be any material known to be or found to be acceptable for use as a cathode material. In some preferred embodiments, the cathode comprises at least one material selected from the group consisting of: natural graphite; artificial graphite; amorphous carbon; an alloy comprising tin and/or silicon; a spinel lithium titanium oxide; and combinations thereof.

Unless described otherwise in particular embodiments, the thickness of the anode is not so limited. In some preferred embodiments, the thickness of the anode is from about 50 to about 200 microns, from about 55 to 200 microns, from about 60 to 200 microns, from about 65 to 200 microns, from about 70 to 200 microns, from about 75 to 200 microns, from about 80 to 200 microns, from about 85 to 200 microns, from about 90 to 200 microns, from about 90 to 200 microns, from about 100 to 200 microns, from about 105 to 200 microns, from about 110 to 200 microns, from about 115 to 200 microns, from about 120 to 200 microns, from about 125 to 200 microns, from about 130 to 200 microns, from about 135 to 200 microns, from about 140 to 200 microns, from about 145 to 200 microns, from about 150 to 200 microns, from about 155 to 200 microns, from about 160 to 200 microns, from about 170 to 200 microns, from about 180 to 200 microns, or from about 200 microns. In some preferred embodiments, the anode thickness is from about 61 microns or higher. In some preferred embodiments, the thickness is about 90 microns or higher. In other preferred embodiments, the thickness is from about 122 microns or higher. See FIG. 19, which shows that when the electrode thickness is about 61 microns or higher, about 90 microns or higher, or about 122 microns or higher lithium deposition does not start, even when the charge is above 3.5 C (1 C=2.3 mA/cm$^2$). In some embodiments, Li deposition may be avoided even at charge rates of 5.0 C or more, 6.0 C or more, 7.0 C or more, 8.0 C or more, or 9.0 C or more. When referring to the thickness of the anode, the word "about" means ±5 microns.

The thickness of the cathode is also not so limited. The thickness of the cathode is from about 50 to about 200 microns, from about 60 to 200 microns, from about 70 to 200 microns, from about 80 to 200 microns, from about 90 to 200 microns, from about 100 to 200 microns, from about 110 to 200 microns, from about 120 to 200 microns, from about 130 to 200 microns, from about 140 to 200 microns, from about 150 to 200 microns, from about 160 to 200 microns, from about 170 to 200 microns, from about 180 to 200 microns, or from about 190 to 200 microns. In some preferred embodiments, the thickness of the cathode may be about 74 microns or higher, about 111 microns or higher, or about 148 microns or higher. See FIG. 19, which shows that when the electrode thickness is about 74 microns or higher, about 111 microns or higher, or about 148 microns or higher lithium deposition does not start, even when the charge is above 3.5 C (1 C=2.3 mA/cm$^2$). In some embodiments, Li deposition may be avoided even at charge rates of 5.0 C or more, 6.0 C or more, 7.0 C or more, 8.0 C or more, or 9.0 C or more. When referring to the thickness of the cathode, the word "about" means ±5 microns.

Figure 17:
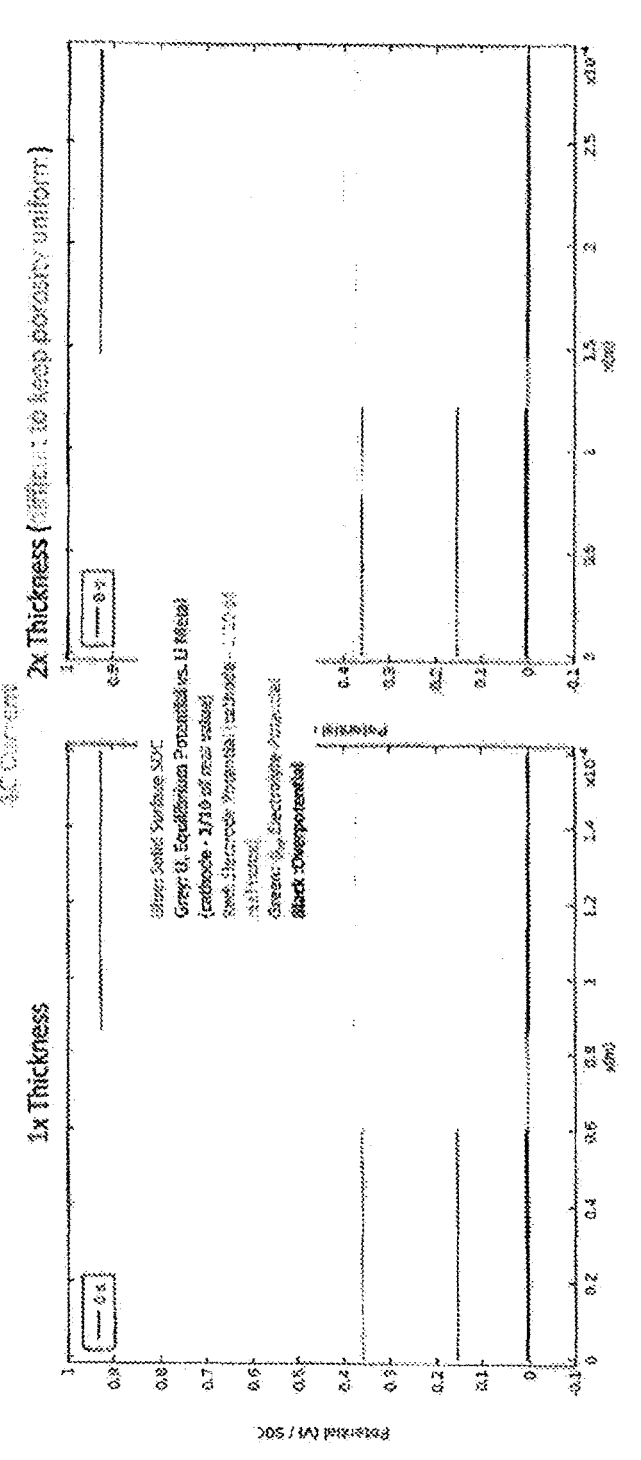
FIG. 17 includes two graphs plotting Potential (V)/SOC over thickness x(m) in electrodes having two different thicknesses of 1× and 2× at a beginning state (t=0).
Figure 18:
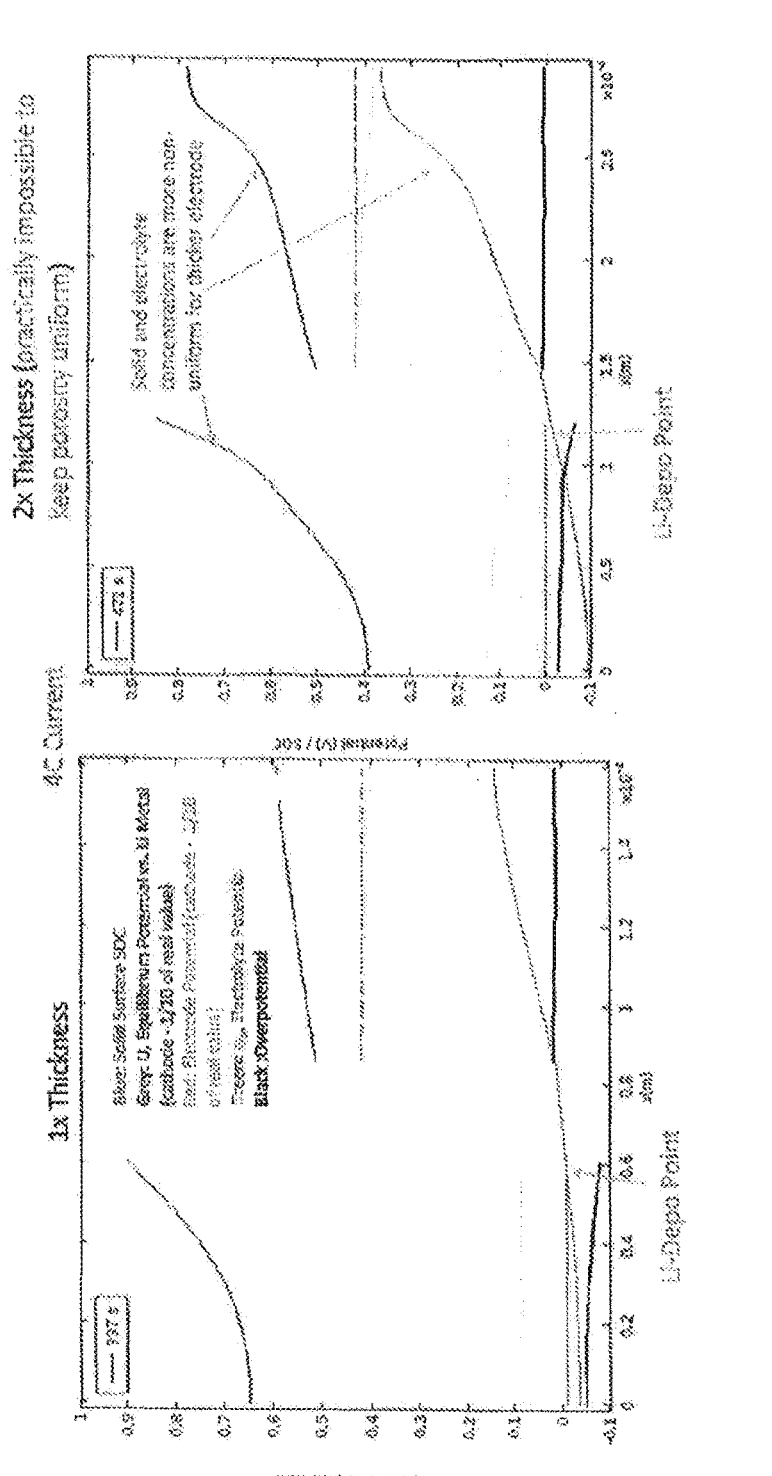
FIG. 18 includes two graphs of Potential (V)/SOC over thickness x(m) in electrodes having two different thicknesses in a dynamic state (t>0).

Thickness and Li deposition during charge (safety). Thickness and cell rate capability constant charge capacity. The discharge and charge kinetics are similar. Focus on the charge kinetics. Note that for a given electrochemical system, fixed chemistry, particle size of materials and other additives, we assume the effective electrochemical reaction area is relatively fixed. FIG. 17 shows a 4 C charge rate system for electrode thicknesses 1× and 2× at a beginning state (t=0). FIG. 18 shows a 4 C charge rate system for electrode thicknesses 1× and 2× in a dynamic state (t>0).

Unless described otherwise in particular embodiments, the porosity of the anode is not so limited. In some embodiments, it is about 15% (0.15) or higher, in some embodiments, it is about 20% (0.2) or higher, in some preferred embodiments, it is about 30% (0.3) or higher, and in some even more preferred embodiments, it is about 40% (0.4) or higher. The word "about" when referring to anode porosity means ±5%. As shown in FIG. 20, when the anode porosity is about 15% or higher, about 20% or higher, about 30% or higher, or about 40% or higher, lithium deposition does not start in a cell even when the charge rate is equal to or greater than 3.0 C. In some embodiments, Li deposition may not begin even at charge rates equal to or greater than 3.5 C, 4.0 C, 4.5 C, 5.0 C, 6.0 C, 7.0 C,or higher. In FIG. 20, the thickness of the electrode is varied so that each example has the same amount of active material, and therefore that variable is not affecting the results.

The porosity of the cathode is also not limited. In some embodiments, it is about 10% (0.1) or higher, or in preferred embodiments, about 15% (0.15) or higher, about 20% (0.20) or higher, or about 30% (0.3) or higher. The word "about" when referring to cathode porosity means ±5%. As shown in FIG. 20, when the cathode porosity is about 10% or higher, about 15% or higher, about 20% or higher, or about 30% or higher, lithium deposition does not start in a cell even when the charge rate is equal to or greater than 3.5 C. In some embodiments, Li deposition may not begin even at charge rates equal to or greater than 3.5 C, 4.0 C, 4.5 C, 5.0 C, 6.0 C, 7.0 C, or higher. In FIG. 20, the thickness of the electrode is varied so that each example has the same amount of active material, and therefore that variable is not affecting the results.

Unless described otherwise in particular embodiments, the tortuosity of the anode is not so limited. In some preferred embodiments, the anode tortuosity is about 1.2 or lower, about 1.3 or lower, about 1.5 or lower, or about 1.7 or lower. In some embodiments, the anode tortuosity 1.0 or higher and 2.0 or lower. In some preferred embodiments, the anode tortuosity is from about 1.0 to about 1.3 or from 1.0 to 1.3. When referring to anode tortuosity, "about" means ±0.2. As shown in FIG. 21, when the anode tortuosity is between 1.0 and 1.3, lithium deposition does not start in a cell even when the charge rate is equal to or greater than 3.5 C. When the tortuosity is between 1.0 and 1.7, lithium deposition does not start in a cell even when the charge rate is equal to or greater than 3.0 C. In some embodiments, lithium deposition may not begin even if at charge rates greater than 4.0 C, 4.5 C, 5.0 C, 6.0 C, or 7.0 C.

Likewise, unless described otherwise in particular embodiments, the tortuosity of the cathode is not so limited. In some preferred embodiments, the cathode tortuosity is about 1.7 or lower, about 1.5 or lower, about 1.3 or lower, or about 1.2 or lower. The cathode tortuosity may be as low as 1.0 or as high as about 2.0. In some preferred embodiments, the cathode tortuosity is between about 1.0 and about 1.5 or between about 1.2 and about 2.5. When referring to cathode tortuosity, "about" means ±0.2. As shown in FIG. 21, when the anode tortuosity is between 1.0 and 1.3, lithium deposition does not start in a cell even when the charge rate is equal to or greater than 3.5 C. When the tortuosity is between 1.0 and 1.7, lithium deposition does not start in a cell even when the charge rate is equal to or greater than 3.0 C. In some embodiments, lithium deposition may not begin even if at charge rates greater than 4.0 C, 4.5 C, 5.0 C, 6.0 C, or 7.0 C.

The anode and cathode materials are as described above. In some preferred embodiments, the anode and cathode materials are combined with a binder to form the anode and the cathode. Unless described otherwise in particular embodiments, the relative amounts of anode or cathode material and binder in this combination is not so limited. In some preferred embodiments, the amount of active material (i.e., cathode or anode material) is from 80 wt. % to 99.9 wt. %. In some preferred embodiments, the amount is from 90 to 99.9 wt. % and in some other preferred embodiments, the amount is from 95 to 99.9 wt. %.

In FIG. 22, an exemplary cell according to the disclosure herein is provided.

In addition to the anode and cathode, the energy cell herein may comprise an electrolyte or an electrolyte and a separator.

Unless described otherwise in particular embodiments, the separator is not so limited, and may be any separator described herein. Unless described otherwise in particular embodiments, the electrolyte is not so limited and may be any electrolyte known to be or found to be useful in a primary or secondary energy cell. In some preferred embodiments, the electrolyte may be selected from the group consisting of: ethylene carbonate (EC); ethyl methyl carbonate (EMC); diethyl carbonate (DEC); dimethyl carbonate (DMC); propylene carbonate (PC); and combinations thereof.

In some embodiments, the electrolyte may comprise an electrolyte additive added thereto.

Electrolyte additives as described herein are not so limited as long as the electrolyte is consistent with the stated goals herein. The electrolyte additive may be any additive typically added by battery makers, particularly lithium battery makers to improve battery performance. For example, exemplary electrolyte additives are disclosed in *A Review of Electrolyte Additives for Lithium-Ion Batteries,* J. of Power Sources, vol. 162, issue 2, 2006 pp. 1379-1394, which is incorporated by reference herein in its entirety. In some preferred embodiments, the electrolyte additive is at least one selected from the group consisting of a SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, and a viscosity improver. In some embodiments the additive may have more than one property, e.g., it may be a wetting agent and a viscosity improver.

Exemplary SEI improving agents include VEC (vinyl ethylene carbonate), VC (vinylene carbonate), FEC (fluoroethylene carbonate), LiBOB (Lithium bis(oxalato) borate). Exemplary cathode protection agents include N,N'-dicyclohexylcarbodiimide, N,N-diethylamino trimethylsilane, LiBOB. Exemplary flame-retardant additives include TTFP (tris(2,2,2-trifluoroethyl) phosphate), fluorinated propylene carbonates, MFE (methyl nonafluorobuyl ether). Exemplary $LiPF_6$ salt stabilizers include LiF, TTFP (tris(2, 2,2-trifluoroethyl) phosphite), 1-methyl-2-pyrrolidinone, fluorinated carbamate, hexamethyl-phosphoramide. Exemplary overcharge protectors include xylene, cyclohexylbenzene, biphenyl, 2,2-diphenylpropane, phenyl-tert-butyl carbonate. Exemplary Li deposition improvers include $AlI_3$, $SnI_2$, cetyltrimethylammonium chlorides, perfluoropolyethers, tetraalkylammonium chlorides with a long alkyl chain. Exemplary ionic salvation enhancer include 12-crown-4, TPFPB (tris(pentafluorophenyl)). Exemplary Al corrosion inhibitors include LiBOB, LiODFB, e.g., borate salts. Exemplary wetting agents and viscosity diluters include cyclohexane and $P_2O_5$.

Anode or Cathode

Unless described otherwise in particular embodiments, the anode or cathode described herein are not so limited and may be like those incorporated into the energy cell described herein. However, the anode and cathode described under this heading are not incorporated into an energy cell, but they may be in the future.

Composite, Vehicle, or Device

A composite comprising a battery separator as described hereinabove and one or more electrodes, e.g., an anode, a cathode, or an anode and a cathode, provided in direct contact therewith. The type of electrodes are not so limited. For example, the electrodes can be those suitable for use in a lithium ion secondary battery.

A suitable anode can have an energy capacity greater than or equal to 372 mAh/g, preferably ≥700 mAh/g, and most preferably ≥1000 mAH/g. The anode be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode is not made solely from intercalation compounds containing lithium or insertion compounds containing lithium.

A suitable cathode may be any cathode compatible with the anode and may include an intercalation compound, an insertion compound, or an electrochemically active polymer. Suitable intercalation materials includes, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable polymers include, for example, polyacetylene, polypyrrole, polyaniline, and polythiopene.

Any separator, energy cell, or anode or cathode described hereinabove may be incorporated into to any vehicle, e.g., an e-vehicle, or device, e.g., a cell phone or laptop, that completely or partially battery powered.

In accordance with at least selected embodiments, aspects, or objects, the present disclosure or invention may provide or may be directed to novel or improved separators, battery separators, electrodes, cathodes, anodes, batteries, cells, systems, and/or methods of design, understanding, manufacture and/or use of such separators, battery separators, electrodes, cathodes, anodes, cells, systems, and/or the like for lithium batteries, especially secondary lithium batteries, such as secondary lithium ion batteries, and/or CE, ESS, and/or EDV batteries. In accordance with at least certain embodiments, the present disclosure or invention is directed to new or improved ways to look at or to define tortuosity, porosity, lithium deposition, and cell design using such new thinking, definitions, and/or data. In addition, disclosed herein are methods, systems and battery components for enhancing battery life, reducing battery failure, reducing dendrites, reducing lithium deposition, retaining charge and discharge rates, improved configurations, improved performance, and/or the like.

In accordance with at least selected embodiments, aspects, or objects, the present disclosure or invention may provide or may be directed to novel or improved separators, battery separators, electrodes, cathodes, anodes, batteries, cells, systems, and/or methods of design, understanding, manufacture and/or use of such separators, battery separators, electrodes, cathodes, anodes, cells, systems, and/or the like for lithium batteries, especially secondary lithium batteries, such as secondary lithium ion batteries, and/or CE, ESS, and/or EDV batteries, for example, including:

An improved porous membrane or battery separator comprising a porous membrane having at least one of the following properties when wet with electrolyte:

has no or low volume;
  has no or low mass;
  soaks as much liquid electrolyte as possible;
  blocks or removes any harmful substances in the electrolyte;
  never melts at any high temperature;
  does not react with the cathode or the anode under any conditions;
  has a mechanical strength equal to or greater than steel;
  is an electronic insulator under any conditions;
  blocks metal dendrite growth.

The above battery separator, wherein when wet with electrolyte, the separator has no or low volume.

The above battery separator, wherein when wet with electrolyte, the separator has no or low mass.

The above battery separator, wherein when wet with electrolyte, the separator soaks as much liquid electrolyte as possible.

The above battery separator, wherein when wet with electrolyte, the separator blocks dendrites.

The above battery separator, wherein when wet with electrolyte, the separator never melts at any high temperature.

The above battery separator, wherein when wet with electrolyte, the separator does not react with the cathode or the anode under any conditions.

The above battery separator, wherein when wet with electrolyte, the separator has a mechanical strength equal to or greater than steel.

The above battery separator, wherein when wet with electrolyte, the separator is an electric insulator under any conditions.

The above battery separator, wherein when wet with electrolyte, the separator blocks metal dendrite growth.

The above battery separator, wherein the separator has at least two of the properties.

The above battery separator, wherein the separator has at least three of the properties.

The above battery separator, wherein the separator has at least four of the properties.

The above battery separator, wherein the separator has at least five of the properties.

The above battery separator, wherein the separator has at least six of the properties.

The above battery separator, wherein the separator has at least seven of the properties.

The above battery separator, wherein the separator has at least eight of the properties.

The above battery separator, wherein the separator has at least nine of the properties.

The above battery separator, wherein the battery separator is macroporous, microporous, or nanoporous, and the pores are filled with an ionic conductive medium.

The above battery separator, wherein the separator conducts lithium ions when dry (no electrolyte) and/or when wet with electrolyte.

The above battery separator, wherein the separator has an infinite Gurley value.

The above battery separator, wherein the separator has an infinite Gurley value.

An energy cell capable of being charged at a charge rate greater than or equal to 3.0 C (1 C=2.3 mA/cm$^2$) without lithium deposition, the energy cell comprising:

an anode that comprises lithium; and a cathode.

The above energy cell, wherein the charge rate is greater than or equal to 3.5 C.

The above energy cell, wherein the charge rate is greater than or equal to 4.0 C.

The above energy cell, wherein the charge rate is equal to or greater than 4.5 C.

The above energy cell, wherein the charge rate is equal to or greater than 3.0 C, but less than 5.0 C.

The above energy cell, wherein the thickness of the anode is from about 50 to about 200 microns.

The above energy cell, wherein the thickness of the anode is from about 60 to about 200 microns.

The above energy cell, wherein the thickness of the anode is from about 60 to about 125 microns.

The above energy cell, wherein the thickness of the cathode is from about 50 to about 200 microns.

The above energy cell, wherein the thickness of the cathode is from about 75 to about 200 microns.

The above energy cell, wherein the thickness of the cathode is from about 75 to about 150 microns.

The above energy cell, wherein the anode porosity is greater than or equal to 15%.

The above energy cell, wherein the anode porosity is greater than or equal to 20%.

The above energy cell, wherein the anode porosity is greater than or equal to 30%.

The above energy cell, wherein the anode porosity is greater than or equal to 40%.

The above energy cell, wherein the anode porosity is greater than or equal to 15%, but less than or equal to 50%.

The above energy cell, wherein the cathode porosity is greater than or equal to 10%.

The above energy cell, wherein the cathode porosity is greater than or equal to 15%.

The above energy cell, wherein the cathode porosity is greater than or equal to 20%.

The above energy cell, wherein the cathode porosity is greater than or equal to 30%.

The above energy cell, wherein the cathode porosity is greater than or equal to 10%, but less than 40%.

The above energy cell, wherein the anode tortuosity is less than or equal to 2.0.

The above energy cell, wherein the anode tortuosity is less than or equal to 1.7.

The above energy cell, wherein the anode tortuosity is less than or equal to 1.5.

The above energy cell, wherein the anode tortuosity is less than or equal to 1.3.

The above energy cell, wherein the anode tortuosity is less than or equal to 1.2.

The above energy cell, wherein the anode tortuosity is greater than or equal to 1.2 and less than or equal to 1.3.

The above energy cell, wherein the cathode tortuosity is less than or equal to 2.0.

The above energy cell, wherein the cathode tortuosity is less than or equal to 1.7.

The above energy cell, wherein the cathode tortuosity is less than or equal to 1.5.

The above energy cell, wherein the cathode tortuosity is less than or equal to 1.3.

The above energy cell, wherein the cathode tortuosity is less than or equal to 1.2.

The above energy cell, wherein the cathode tortuosity is greater than or equal to 1.2 and less than or equal to 1.5.

The above energy cell, wherein the anode that comprises lithium comprises at least one material selected from the group consisting of: lithium cobalt oxide (LCO); lithium manganese oxide (LMO); lithium iron phosphate (LFP); (Li(Ni$_x$Mn$_y$Co$_z$)O$_2$), where 0.33>x>0.9 and x+y+z=1; NCA (Li(Ni$_x$Co$_y$Al$_z$)O$_2$), where 0.8>x>0.9 and x+y+z=1; and combinations thereof.

The above energy cell, wherein the cathode comprises at least one material selected from the group consisting of: natural graphite; artificial graphite; amorphous carbon; an alloy comprising tin and/or silicon; a spinel lithium titanium oxide; and combinations thereof.

The above energy cell, further comprising an electrolyte.

The above energy cell, wherein the electrolyte is selected from the group consisting of: ethylene carbonate (EC); ethyl methyl carbonate (EMC); diethyl carbonate (DEC); dimethyl carbonate (DMC); propylene carbonate (PC); and combinations thereof.

The above energy cell, wherein the electrolyte comprises an electrolyte additive.

The above energy cell, further comprising the above membrane or battery separator.

An anode that comprises lithium.

The above anode, having a thickness of about 50 to about 200 microns.

The above anode, wherein the thickness of the anode is from about 60 to about 200 microns.

The above anode, wherein the thickness of the anode is from about 60 to about 125 microns.

The above anode, wherein the anode porosity is greater than or equal to 15%.

The above anode, wherein the anode porosity is greater than or equal to 20%.

The above anode, wherein the anode porosity is greater than or equal to 30%.

The above anode, wherein the anode porosity is greater than or equal to 40%.

The above anode, wherein the anode porosity is greater than or equal to 15%, but less than or equal to 50%.

The above anode, wherein the anode tortuosity is less than or equal to 2.0.

The above anode, wherein the anode tortuosity is less than or equal to 1.7.

The above anode, wherein the anode tortuosity is less than or equal to 1.5.

The above anode, wherein the anode tortuosity is less than or equal to 1.3.

The above anode, wherein the anode tortuosity is less than or equal to 1.2.

The above anode, wherein the anode tortuosity is greater than or equal to 1.0 and less than or equal to 2.0.

The above anode, wherein the anode tortuosity is greater than or equal to 1.2 and less than or equal to 1.3.

A cathode.

The above cathode, wherein the thickness of the cathode is from about 50 to about 200 microns.

The above cathode, wherein the thickness of the cathode is from about 75 to about 200 microns.

The above cathode, wherein the thickness of the cathode is from about 75 to about 150 microns.

The above cathode, wherein the cathode porosity is greater than or equal to 10%.

The above cathode, wherein the cathode porosity is greater than or equal to 15%.

The above cathode, wherein the cathode porosity is greater than or equal to 20%.

The above cathode, wherein the cathode porosity is greater than or equal to 30%.

The above cathode, wherein the cathode porosity is greater than or equal to 10%, but less than 40%.

The above cathode, wherein the cathode tortuosity is less than or equal to 2.0.

The above cathode, wherein the cathode tortuosity is less than or equal to 1.7.

The above cathode, wherein the cathode tortuosity is less than or equal to 1.5.

The above cathode, wherein the cathode tortuosity is less than or equal to 1.3.

The above cathode, wherein the cathode tortuosity is less than or equal to 1.2.

The above cathode, wherein the cathode tortuosity is greater than or equal to 1.2 and less than or equal to 1.5.

The above anode comprising lithium, wherein the anode that comprises lithium comprises at least one material selected from the group consisting of: lithium cobalt oxide (LCO); lithium manganese oxide (LMO); lithium iron phosphate (LFP); $(Li(Ni_xMn_yCo_z)O_2)$, where $0.33 > x > 0.9$ and $x+y+z=1$; NCA $(Li(Ni_xCo_yAl_z)O_2)$, where $0.8 > x > 0.9$ and $x+y+z=1$; and combinations thereof.

The above cathode, wherein the cathode comprises at least one material selected from the group consisting of: natural graphite; artificial graphite; amorphous carbon; an alloy comprising tin and/or silicon; a spinel lithium titanium oxide; and combinations thereof.

New or improved separators, battery separators, electrodes, cathodes, anodes, batteries, cells, systems, and/or methods of design, understanding, manufacture and/or use of such separators, battery separators, electrodes, cathodes, anodes, cells, systems, and/or the like for lithium batteries, especially secondary lithium batteries, such as secondary lithium ion batteries, and/or CE, ESS, and/or EDV batteries; new or improved ways to look at or to define tortuosity, porosity, lithium deposition, and cell design using such new thinking, definitions, and/or data; new or improved methods, systems and battery components for enhancing battery life, reducing battery failure, reducing dendrites, reducing lithium deposition, retaining charge and discharge rates, improved configurations, improved performance, and/or combinations thereof; and/or the like as shown, described or claimed herein.

In accordance with at least selected embodiments, the present disclosure or invention is directed to novel or improved separators, battery separators, electrodes, cathodes, anodes, batteries, cells, systems, and/or methods of design, understanding, manufacture and/or use of such separators, battery separators, electrodes, cathodes, anodes, cells, systems, and/or the like for lithium batteries, especially secondary lithium batteries, such as secondary lithium ion batteries, and/or CE, ESS, and/or EDV batteries. In accordance with at least certain embodiments, the present disclosure or invention is directed to new or improved ways to look at or to define tortuosity, porosity, lithium deposition, and cell design using such new thinking, definitions, and/or data. In addition, disclosed herein are methods, systems and battery components for enhancing battery life, reducing battery failure, reducing dendrites, reducing lithium deposition, retaining charge and discharge rates, improved configurations, improved performance, and/or the like.

In accordance with at least certain embodiments, disclosed herein is an improved battery separator comprising a porous membrane having at least one of the following properties when wet with electrolyte:has no or low volume; has no or low mass; soaks as much liquid electrolyte as possible; blocks or removes any harmful substances in the electrolyte; never melts at any high temperature; does not react with the cathode or the anode under any conditions; has a mechanical strength equal to or greater than steel; is an electronic insulator under any conditions; blocks metal dendrite growth. Also disclosed herein is an energy cell in which lithium deposition does not occur even at high charge rates. The energy cell may comprise the improved separator disclosed herein. The energy cell further comprise an anode that comprises lithium, and in some embodiments, a cathode that comprises a carbonaceous substance. Also disclosed herein are an anode and cathode, separate from the energy cell, but which may be used in the energy cell disclosed herein.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. "Such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:

1. A battery separator comprising a dry process porous membrane comprising polyethylene and having pores having an average pore size of less than 1 micron, wherein the dry-process porous membrane comprises multiple layers which are co-extruded wherein each layer has a thickness from 0.1 to 0.9 microns, wherein the pores are formed via this dry process and are subsequently filled with an ionic conductive medium, wherein the ionic conductive medium comprises gel electrolyte, and wherein the separator has a JIS Gurley of 75 to 300, wherein the dry process porous membrane contains no residual solvent or processing oil, and wherein the separator conducts lithium ions when dry (no electrolyte).

2. The battery separator of claim 1, wherein the separator has a JIS Gurley of 100 to 300.

3. The battery separator of claim 1, wherein the battery separator is macroporous, microporous, or nanoporous.

4. The battery separator of claim 1, wherein the separator conducts lithium ions when wet with electrolyte.

5. The battery separator of claim 1, wherein the separator when wet with electrolyte, does not react with a cathode or an anode.

6. The battery separator of claim 1, wherein the separator when wet with electrolyte is an electric insulator.

7. The battery separator of claim 1, wherein the separator has a porosity of 40% to 70%.

8. The separator of claim 3, wherein the battery separator is macroporous.

9. The battery separator of claim 3, wherein the battery separator is nanoporous.

10. The battery separator of claim 1, wherein the electrolyte further comprises an electrolyte additive, wherein the electrolyte additive comprises at least one selected from the group of a SEI improving agent selected from the group of EC (vinyl ethylene carbonate), FEC (fluoroethylene carbonate), and LiBOB (Lithium bis (oxalato) borate); a cathode protection agent selected from the group consisting of N,N'-dicyclohexylcarbodiimide, N,N-diethylamino trimethylsilane, and LiBOB; a flame retardant additive selected from the group of TTFP (tris (2,2,2-trifluoroethyl) phosphate), fluorinated propylene carbonates, and MFE (methyl nonafluorobuyl ether); a $LiPF_6$ salt stabilizer selected from the group of LiF, TTFP (tris (2,2,2-trifluoroethyl) phosphite), fluorinated carbamate, and hexamethyl-phosphoramide; an overcharge protector selected from the group of xylene, cyclohexylbenzene, biphenyl, 2,2-diphenylpropane, and phenyl-tert-butyl carbonate; an aluminum corrosion inhibitor selected from the group of LiBOB, LiODFB, and borate salts; a lithium deposition agent or improver selected from the group of $AlI_3$, $SnI_2$, cetyltrimethylammonium chlorides, perfluoropolyethers, and tetraalkylammonium chlorides with a long alkyl chain; a solvation enhancer selected from the group of 12-crown-4, and TPFPB (tris (pentafluorophenyl)); a wetting agent comprising cyclohexane; and a viscosity diluter comprising cyclohexane.

* * * * *